(12) United States Patent
Li et al.

(10) Patent No.: US 12,485,913 B2
(45) Date of Patent: Dec. 2, 2025

(54) VEHICLE INTEGRATED CONTROL METHOD AND APPARATUS, DEVICE, AND STORAGE MEDIUM

(71) Applicants: NINGBO GEELY AUTOMOBILE RESEARCH AND DEVELOPMENT CO., LTD, Zhejiang (CN); ZHEJIANG GEELY HOLDING GROUP CO., LTD, Zhejiang (CN)

(72) Inventors: Guibin Li, Zhejiang (CN); Guowang Kang, Zhejiang (CN); Xiaoyuan Jiang, Zhejiang (CN); Xuefeng Ling, Zhejiang (CN)

(73) Assignees: NINGBO GEELY AUTOMOBILE RESEARCH AND DEVELOPMENT CO., LTD, Ningbo (CN); ZHEJIANG GEELY HOLDING GROUP CO., LTD, Hangzhou (CN)

(*) Notice: Subject to any disclaimer, the term of this patent is extended or adjusted under 35 U.S.C. 154(b) by 307 days.

(21) Appl. No.: 18/017,217

(22) PCT Filed: Jul. 21, 2020

(86) PCT No.: PCT/CN2020/103298
§ 371 (c)(1),
(2) Date: Jan. 20, 2023

(87) PCT Pub. No.: WO2022/016379
PCT Pub. Date: Jan. 27, 2022

(65) Prior Publication Data
US 2023/0303102 A1    Sep. 28, 2023

(51) Int. Cl.
*B60W 50/10* (2012.01)
*B60W 50/14* (2020.01)

(52) U.S. Cl.
CPC ............ *B60W 50/10* (2013.01); *B60W 50/14* (2013.01); *B60W 2050/146* (2013.01)

(58) Field of Classification Search
CPC ................ B60W 50/10; B60W 50/14; B60W 2050/146; B60W 10/30; B60R 16/037
See application file for complete search history.

(56) References Cited

U.S. PATENT DOCUMENTS 6,651,895 B1 * 11/2003 Kadle ...................... F24F 11/30
454/258
9,682,609 B1     6/2017 Dudar
(Continued)

FOREIGN PATENT DOCUMENTS

| CN | 103010125 A | 4/2013 |
|----|-------------|--------|
| CN | 104325911 A | 2/2015 |

(Continued)

OTHER PUBLICATIONS

English translation of CN 111026066A; Zhou Lin; Pan Guodong (Year: 2020).*

(Continued)

*Primary Examiner* — Harry Y Oh
*Assistant Examiner* — Danielle M Jackson
(74) *Attorney, Agent, or Firm* — Westbridge IP LLC

(57) ABSTRACT

Provided is a vehicle integrated control method used for a vehicle integrated control system, wherein the vehicle integrated control system at least can comprise an integration module and a plurality of control modules, and the integration module is provided inside a vehicle. The method comprises: in response to a target operation performed by a user on the integration module, determining a target control instruction corresponding to the target operation; determining a target control module corresponding to the target control instruction, the target control module being at least (Continued)

```
┌─────────────────────────────────────────────────────────────┐
│ Determine, in response to a target operation performed by   │──101
│ a user on the integration module, a target control          │
│ instruction corresponding to the target operation           │
└─────────────────────────────────────────────────────────────┘
                              │
                              ▼
┌─────────────────────────────────────────────────────────────┐
│ Determine a target control module corresponding to the      │──103
│ target control instruction, where the target control        │
│ module is at least one of a plurality of control modules    │
└─────────────────────────────────────────────────────────────┘
                              │
                              ▼
┌─────────────────────────────────────────────────────────────┐
│ Activate the target control module to cause the target      │──105
│ control module to control the enabling or disabling of a    │
│ corresponding function based on attribute information of    │
│ internal and external environment of a vehicle              │
└─────────────────────────────────────────────────────────────┘
``` one of the plurality of control modules; and activating the target control module to cause the target control module to control the enabling or disabling of a corresponding function on the basis of attribute information of internal and external environments of the vehicle. Also disclosed are a vehicle integrated control apparatus, a device, and a storage medium.

16 Claims, 9 Drawing Sheets

(56) References Cited

U.S. PATENT DOCUMENTS

| | | |
|---|---|---|
| 2005/0134117 A1 | 6/2005 | Ito et al. |
| 2007/0007067 A1 | 1/2007 | Pollehn et al. |
| 2008/0082226 A1* | 4/2008 | Amador ............... B60R 16/037 701/31.4 |
| 2018/0118109 A1* | 5/2018 | Fujisawa ............... B60K 35/22 |
| 2018/0118186 A1 | 5/2018 | Yi et al. |
| 2018/0208017 A1* | 7/2018 | Hernandez ............ B60K 35/10 |
| 2020/0239011 A1* | 7/2020 | Hofmann ............. B60R 16/037 |
| 2022/0118996 A1* | 4/2022 | Jaegal ................... B60W 50/10 |
| 2023/0142657 A1* | 5/2023 | Wada ................. B60H 1/00771 701/23 |

FOREIGN PATENT DOCUMENTS

| | | |
|---|---|---|
| CN | 108482056 A | 9/2018 |
| CN | 109414973 A | 3/2019 |
| CN | 111026066 A | 4/2020 |
| CN | 111201161 A | 5/2020 |
| DE | 102010011319 A1 | 9/2011 |
| DE | 102013208347 A1 | 11/2014 |
| DE | 102017009353 A1 | 4/2019 |
| DE | 102018003281 A1 | 10/2019 |
| JP | 2006001305 A | 1/2006 |
| WO | 2018177001 A1 | 10/2018 |

OTHER PUBLICATIONS

Chinese Intellectual Property Office (ISR/CN), "International Search Report for PCT/CN2020/103298", China, Apr. 22, 2021.
Office Action issued in counterpart European Patent Application No. EP 20945849.6, dated Dec. 13, 2023.
EPO, "Supplementary European Search Report for EP Application No. 20945849.6", Berlin, Germany, Jun. 23, 2023.
First Office Action issued in counterpart Chinese Patent Application No. 202080102265.6, dated Mar. 12, 2025.

* cited by examiner

VEHICLE INTEGRATED CONTROL METHOD AND APPARATUS, DEVICE, AND STORAGE MEDIUM

CROSS-REFERENCE TO RELATED PATENT APPLICATIONS

This application is a U.S. national stage application of PCT Patent Application No. PCT/CN2020/103298, filed Jul. 21, 2020, which is incorporated herein in its entirety by reference.

FIELD OF THE INVENTION

The present application belongs to the technical field of comfort and health control in a vehicle, and in particular to a vehicle integrated control method and apparatus, a device, and a storage medium.

BACKGROUND OF THE INVENTION

At present, with the development of science and technology and the improvement of living standards, the number of automobiles is increasing year by year, and automobiles become a popular means of transportation.

Comfort and health requirements in a vehicle are one of the main reference standards for people to buy a vehicle. In order to improve user experience, existing automobiles are also constantly improving the comfort and health requirements in the vehicle through relevant control functions, and the relevant control functions include, but are not limited to, automatic control of vehicle internal temperature, automatic control of air outlet mode, automatic control of air volume, automatic control of internal and external circulation dampers, automatic control of seat heating, automatic control of seat ventilation, automatic control of steering wheel heating, automatic control of negative ion purification and the like.

However, the relevant functions described above are provided with corresponding control panels or keys. On the one hand, keys with different function are set in a distributed manner. Since the keys with different functions are not set in a centralized manner, when a user enables different functions, the user needs to manually press different keys, which is inconvenient to use, is not highly intelligent, and has poor user experience. On the other hand, the use of a plurality of keys has high cost and a complex operation interface.

BRIEF DESCRIPTION OF THE INVENTION

In order to implement automatic control of a plurality of functions through an integration module, reduce the cost of controlling the plurality of functions, and improve the intelligence of controlling the plurality of functions and user convenience, the present application provides a vehicle integrated control method and apparatus, a device, and a storage medium.

In one aspect, the present application provides a vehicle integrated control method, including:
    determining, in response to a target operation performed by a user on the integration module, a target control instruction corresponding to the target operation;
    determining a target control module corresponding to the target control instruction, where the target control module is at least one of the plurality of control modules; and
    activating the target control module to cause the target control module to control the enabling or disabling of a corresponding function based on attribute information of internal and external environment of a vehicle.

Specifically, before determining, in response to a target operation performed by a user on the integration module, a target control instruction corresponding to the target operation, the method further includes:
    pre-establishing a mapping relationship among an operation, a control instruction, and a control module;
    determining, in response to a target operation performed by a user on the integration module, a target control instruction corresponding to the target operation comprises:
    in response to the target operation performed by the user on the integration module, determining the target control instruction corresponding to the target operation based on the mapping relationship; and
    the determining a target control module corresponding to the target control instruction comprises:
    determining the target control module corresponding to the target control instruction based on the mapping relationship.

Specifically, after activating the target control module, the method further includes:
    acquiring the attribute information of internal and external environment, and transmitting the acquired attribute information of internal and external environment to the target control module, where the attribute information of internal and external environment comprises at least one of internal and external environment information, occupant information, or driving state information; and
    adjusting the target control module from an activated state to an enabled state when the attribute information of internal and external environment meets a preset condition.

Specifically, the vehicle integrated control system further includes a prompt module respectively corresponding to each control module, the prompt module is integrally arranged on the integration module, and the method further includes:
    determining, in response to the target operation performed by the user on the integration module, a prompt module corresponding to the target operation; and
    enabling the prompt module corresponding to the target control instruction,
    where the prompt module comprises at least one of an optical module, a sound module, a text module, an image module, or a symbol module.

Specifically, the optical module is an indicator light, and different control modules correspond to different indicator lights.

Specifically, the vehicle integrated control system further includes one prompt module corresponding to the plurality of control modules, the prompt module is integrally arranged on the integration module, and the method further includes:
    determining, in response to the target operation performed by the user on the integration module, a prompt mode corresponding to the target operation; and
    enabling the prompt module and controlling the prompt module to prompt according to the prompt mode, such that the prompt module presents a state corresponding to the prompt mode, where the prompt module includes an optical module, a sound module, a text module, an image module or a symbol module.

Specifically, the optical module is an indicator light, and different control modules correspond to different colors of the same indicator light.

Specifically, the target control module includes an air conditioning automatic control module, the target operation includes a first target operation, the target control instruction includes a first target control instruction, the attribute information of internal and external environment includes the internal and external environment information, and the internal and external environment information includes an internal environment temperature, and the method further includes:
- determining, in response to the first target operation comprising pressing or touching performed by the user on the integration module, the first target control instruction corresponding to the first target operation;
- determining the air conditioning automatic control module corresponding to the first target control instruction;
- activating the air conditioning automatic control module;
- enabling the prompt module corresponding to the first target operation;
- acquiring an internal environment temperature of the vehicle;
- when the internal environment temperature does not meet a preset internal temperature threshold, adjusting the air conditioning automatic control module from an activated state to an enabled state; and
- adjusting the internal environment temperature and/or air volume entering the vehicle through the air conditioning automatic control module, such that the internal environment temperature meets the preset internal temperature threshold.

Specifically, when the internal environment temperature meets a preset internal temperature threshold, the activated state of the air conditioning automatic control module is maintained.

Specifically, the target control module further includes a seat heating and ventilation module, the target operation further includes a second target operation, the target control instruction further includes a second target control instruction, the attribute information of internal and external environment includes the internal and external environment information and the occupant information, and the internal and external environment information includes an external environment temperature, and the method further includes:
- determining, in response to the user continuing to perform the second target operation comprising pressing or touching on the integration module, the second target control instruction corresponding to the second target operation;
- determining the seat heating and ventilation module corresponding to the second target control instruction;
- activating the seat heating and ventilation module;
- enabling the prompt module corresponding to the second target operation;
- acquiring pressure information of a seat in the vehicle, a seat temperature of the seat, and an external environment temperature of the vehicle, the occupant information being represented by the pressure information;
- when the pressure information is greater than a preset pressure threshold, the seat temperature does not meet a preset seat temperature threshold, and the external environment temperature meets a preset external environment threshold, adjusting the seat heating and ventilation module from an activated state to an enabled state; and
- heating and/or ventilating the seat based on the seat heating and ventilation module, such that the seat temperature meets the preset seat temperature threshold.

Specifically, when the pressure information is less than or equal to the preset pressure threshold, the seat temperature meets the preset seat temperature threshold, or the external environment temperature does not meet the preset external environment threshold, the activated state of the seat heating and ventilation module is maintained.

Specifically, the target control module further includes an air purification and sterilization module, the target operation includes a third target operation, the target control instruction further includes a third target control instruction, the attribute information of internal and external environment includes the internal and external environment information and the driving state information, and the internal and external environment information includes internal air parameter information, and the method further includes:
- determining, in response to the user continuing to perform the third target operation comprising pressing or touching on the integration module, the third target control instruction corresponding to the third target operation;
- determining the air purification and sterilization module corresponding to the third target control instruction;
- activating the air purification and sterilization module;
- enabling the prompt module corresponding to the third target operation;
- acquiring internal air parameter information of the vehicle and driving state information of the vehicle;
- when the internal air parameter information is greater than a preset parameter threshold and the driving state information meets a preset driving condition, adjusting the air purification and sterilization module from an activated state to an enabled state; and
- purifying and sterilizing the air in the vehicle based on the air purification and sterilization module, such that the air parameter information is less than or equal to the preset parameter threshold.

Specifically, when the internal air parameter information is less than or equal to the preset parameter threshold or the driving state information does not meet the preset driving condition, the activated state of the air purification and sterilization module is maintained.

Specifically, the target operation further includes a fourth target operation, the target control instruction further includes a fourth target control instruction, and the method further includes:
- determining, in response to the user continuing to perform the fourth target operation comprising pressing or touching on the integration module, the fourth target control instruction corresponding to the fourth target operation;
- determining the air conditioning automatic control module, the seat heating and ventilation module, and the air purification and sterilization module corresponding to the fourth target control instruction; and
- disabling the air conditioning automatic control module, the seat heating and ventilation module, and the air purification and sterilization module.

Specifically, the vehicle integrated control system further includes a terminal device of a user corresponding to the vehicle, and determining, in response to a target operation performed by a user on the integration module, a target control instruction corresponding to the target operation includes:
- receiving a remote control instruction sent by the terminal device to the integration module;
- determining a target operation corresponding to the remote control instruction; and determining a target control instruction corresponding to the target operation.

Specifically, the vehicle integrated control system further includes a terminal device of a user corresponding to the vehicle, and after adjusting the target control module from an activated state to an enabled state when the attribute information of internal and external environment meets the preset condition, the method may include:
  determining a target control strategy corresponding to the target control module;
  sending the target control strategy to the terminal device;
  when receiving an instruction for executing the target control strategy triggered by a user based on the terminal device, controlling the enabling or disabling of a corresponding function through the target control strategy; and
  when receiving an instruction for not executing the target control strategy triggered by the user based on the terminal device module, prohibiting control on the enabling or disabling of a corresponding function through the target control strategy.

In another aspect, embodiments of the present application further provide a vehicle integrated control apparatus, a vehicle integrated control system at least may include an integration module and a plurality of control modules, the integration module is arranged in a vehicle, and the method includes:
  a control instruction determination module, configured to determine, in response to a target operation performed by a user on the integration module, a target control instruction corresponding to the target operation;
  a control module determination module, configured to determine a target control module corresponding to the target control instruction, where the target control module is at least one of the plurality of control modules; and
  an activation module, configured to activate the target control module to cause the target control module to control the enabling and disabling of a corresponding function based on attribute information of internal and external environment of the vehicle.

Specifically, the apparatus may further include:
  a mapping relationship establishment module, configured to pre-establish a mapping relationship among an operation, a control instruction, and a control module.

The control instruction determination module is further configured to determine, in response to the target operation performed by a user on the integration module, the target control instruction corresponding to the target operation based on the mapping relationship.

The control module determination module is further configured to determine the target control module corresponding to the target control instruction based on the mapping relationship.

Specifically, the apparatus may further include:
  an internal and external environment attribute information acquisition module, configured to acquire the attribute information of internal and external environment, and transmit the acquired attribute information of internal and external environment to the target control module, where the attribute information of internal and external environment includes at least one of internal and external environment information, occupant information, or driving state information; and
  a first state adjustment module, configured to adjust, when the attribute information of internal and external environment meets a preset condition, the target control module from an activated state to an enabled state.

Specifically, the vehicle integrated control system further includes a prompt module respectively corresponding to each control module, the prompt module is integrally arranged on the integration module, and the apparatus may further include:
  a prompt module determination module, configured to determine, in response to the target operation performed by the user on the integration module, a prompt module corresponding to the target operation; and
  a first prompt module enabling module, configured to enable a prompt module corresponding to the target control instruction, where the prompt module includes at least one of an optical module, a sound module, a text module, an image module or a symbol module.

Specifically, the vehicle integrated control system further includes one prompt module corresponding to the plurality of control modules, the prompt module is integrally arranged on the integration module, and the apparatus may further include:
  a prompt mode determination module, configured to determine, in response to the target operation performed by the user on the integration module, a prompt mode corresponding to the target operation; and
  a second prompt module enabling module, configured to enable the prompt module and control the prompt module to prompt according to the prompt mode, such that the prompt module presents a state corresponding to the prompt mode, where the prompt module includes an optical module, a sound module, a text module, an image module or a symbol module.

Specifically, the target control module includes an air conditioning automatic control module, the target operation includes a first target operation, the target control instruction includes a first target control instruction, the attribute information of internal and external environment includes the internal and external environment information, and the internal and external environment information includes an internal environment temperature, and the apparatus may further include:
  a first target control instruction determination module, configured to determine, in response to the first target operation including pressing or touching performed by the user on the integration module, the first target control instruction corresponding to the first target operation;
  an air conditioning automatic control determination module, configured to determine the air conditioning automatic control module corresponding to the first target control instruction;
  an air conditioning automatic control activation module, configured to activate the air conditioning automatic control module;
  a third prompt module enabling module, configured to enable a prompt module corresponding to the first target operation;
  an internal environment temperature acquisition module, configured to acquire an internal environment temperature of the vehicle;
  a second state adjustment module, configured to adjust, when the internal environment temperature does not meet a preset internal temperature threshold, the air conditioning automatic control module from an activated state to an enabled state; and
  an air conditioning automatic adjustment module, configured to adjust the internal environment temperature and/or air volume entering the vehicle through the air conditioning automatic control module, such that the internal environment temperature meets the preset internal temperature threshold.

Accordingly, the apparatus further includes:

a first maintaining module, configured to maintain the activated state of the air conditioning automatic control module when the internal environment temperature meets the preset internal temperature threshold.

Accordingly, the target control module further includes a seat heating and ventilation module, the target operation further includes a second target operation, the target control instruction further includes a second target control instruction, the attribute information of internal and external environment includes the internal and external environment information and the occupant information, and the internal and external environment information includes an external environment temperature, and the apparatus may further include:

a second target control instruction determination module, configured to determine, in response to the user continuing to perform the second target operation including pressing or touching on the integration module, the second target control instruction corresponding to the second target operation;

a seat heating and ventilation determination module, configured to determine the seat heating and ventilation module corresponding to the second target control instruction;

a seat heating and ventilation activation module, configured to activate the seat heating and ventilation module;

a fourth prompt module enabling module, configured to enable a prompt module corresponding to the second target operation;

a pressure and temperature acquisition module, configured to acquire pressure information of a seat in the vehicle, a seat temperature of the seat, and an external environment temperature of the vehicle;

a third state adjustment module, configured to adjust, when the pressure information is greater than a preset pressure threshold, the seat temperature does not meet a preset seat temperature threshold, and the external environment temperature meets a preset external environment threshold, the seat heating and ventilation module from an activated state to an enabled state; and a seat heating and ventilation processing module, configured to heat and/or ventilate the seat based on the seat heating and ventilation module, such that the seat temperature meets the preset seat temperature threshold.

Accordingly, the apparatus further includes:

a second maintaining module, configured to maintain the activated state of the seat heating and ventilation module when the pressure information is less than or equal to the preset pressure threshold, the seat temperature meets the preset seat temperature threshold, or the external environment temperature does not meet the preset external environment threshold.

Accordingly, the target control module further includes an air purification and sterilization module, the target operation includes a third target operation, the target control instruction further includes a third target control instruction, the attribute information of internal and external environment includes the internal and external environment information and the driving state information, and the internal and external environment information includes internal air parameter information, and the apparatus may further include:

a third target control instruction determination module, configured to determine, in response to the user continuing to perform the third target operation including pressing or touching on the integration module, the third target control instruction corresponding to the third target operation;

an air purification and sterilization determination module, configured to determine the air purification and sterilization module corresponding to the third target control instruction;

an air purification and sterilization activation module, configured to activate the air purification and sterilization module;

a fifth prompt module enabling module, configured to enable a prompt module corresponding to the third target operation;

a parameter and state information acquisition module, configured to acquire internal air parameter information of the vehicle and driving state information of the vehicle;

a fourth state adjustment module, configured to adjust, when the internal air parameter information is greater than a preset parameter threshold and the driving state information meets a preset driving condition, the air purification and sterilization module from an activated state to an enabled state; and a purification and sterilization processing module, configured to purify and sterilize the air in the vehicle based on the air purification and sterilization module, such that the air parameter information is less than or equal to the preset parameter threshold.

Accordingly, the apparatus further includes:

a third maintaining module, configured to maintain the activated state of the air purification and sterilization module when the internal air parameter information is less than or equal to the preset parameter threshold or the driving state information does not meet the preset driving condition.

Accordingly, the target operation further includes a fourth target operation, the target control instruction further includes a fourth target control instruction, and the apparatus may further include:

a fourth target control instruction determination module, configured to determine, in response to the user continuing to perform the fourth target operation including pressing or touching on the integration module, the fourth target control instruction corresponding to the fourth target operation;

a multi-module determination module, configured to determine the air conditioning automatic control module, the seat heating and ventilation module, and the air purification and sterilization module corresponding to the fourth target control instruction; and a disabling module, configured to disable the air conditioning automatic control module, the seat heating and ventilation module, and the air purification and sterilization module.

Specifically, the vehicle integrated control system further includes a terminal device of a user corresponding to the vehicle, and the control instruction determination module may include:

a sending unit, configured to receive a remote control instruction sent by the terminal device to the integration module;

a target operation determination unit, configured to determine a target operation corresponding to the remote control instruction; and a target control instruction determination unit, configured to determine a target control instruction corresponding to the target operation.

Accordingly, the vehicle integrated control system further comprises a terminal device of a user corresponding to the vehicle, and the apparatus may further include:

a target control strategy determination module, configured to determine a target control strategy corresponding to the target control module;

a target control strategy sending module, configured to send the target control strategy to the terminal device;

a function control module, configured to control, when receiving an instruction for executing the target control strategy triggered by a user based on the terminal device, the enabling or disabling of a corresponding function through the target control strategy; and a prohibition module, configured to prohibit, when receiving an instruction for not executing the target control strategy triggered by the user based on the terminal device module, control on the enabling or disabling of a corresponding function through the target control strategy.

In another aspect, the present invention provides an electronic device for vehicle integrated control, the electronic device including a processor and a memory, where the memory stores at least one instruction or at least one program, and the at least one instruction or the at least one program is loaded and executed by the processor to implement the vehicle integrated control method provided by the foregoing method embodiments.

In another aspect, the present invention provides a computer-readable storage medium, the storage medium storing at least one instruction or at least one program, where the at least one instruction or the at least one program is loaded and executed by a processor to implement the vehicle integrated control method described above.

Embodiments of the present application provide a vehicle integrated control method and apparatus, a device, and a storage medium. An integration module is arranged in a vehicle, and the integration module is electrically connected to a plurality of control modules (such as an air conditioning automatic control module, a seat heating and ventilation module, and an air purification and sterilization module). When the integration module receives a target operation of a user, a target control instruction corresponding to the target operation may be determined, then a target control module corresponding to the target control instruction (the target control module including at least one of the plurality of control modules) is determined, and finally the target control module is activated, such that the target control module controls the enabling or disabling of a corresponding function based on attribute information of internal and external environment of the vehicle. Namely, the present application may automatically control a plurality of functions through one integration module. Since the plurality of functions are controlled through one integration module, on the one hand, the defect that each function (i.e. a control module) is provided with a control panel or a key, and when the user enables different functions, the user needs to manually press different keys is avoided, thereby improving user convenience; on the other hand, replacing the traditional different keys with one integration module has the advantages of low manufacturing cost, simple operation interface and high intelligence.

BRIEF DESCRIPTION OF THE DRAWINGS

In order to more clearly illustrate the technical solutions and advantages of the embodiments of the present application or the prior art, the accompanying drawings required in the descriptions of the embodiments or the prior art will be briefly introduced below. Apparently, the accompanying drawings in the following descriptions are only some embodiments of the present application, and those of ordinary skill in the art may still obtain other drawings from these drawings without creative efforts.

DETAILED DESCRIPTION

In order to enable those skilled in the art to better understand the solutions of the present application, the technical solutions in the embodiments of the present invention will be clearly and completely described below in conjunction with the accompanying drawings in the embodiments of the present invention. Apparently, the described embodiments are only part rather than all of the embodiments of the present invention. On the basis of the embodiments in the present application, all other embodiments acquired by those of ordinary skilled in the art without creative efforts shall fall within a protection scope of the present application.

It should be noted that the terms "first", "second", and the like in the present specification, the claims, and the drawings of the present invention are used to distinguish between similar objects and not necessarily to describe a specific sequence or order. It should be understood that data so used are interchangeable under appropriate circumstances, such that the embodiments of the present invention described herein can be implemented in a sequence other than those illustrated or described herein. In addition, the terms "comprising", and "having" and any variations thereof are intended to cover non-exclusive inclusion. For example, a process, a method, a system, a product or a server including a series of steps or units is not necessarily limited to the explicitly listed steps or units, but may include other steps or units that are not explicitly listed or are inherent to such process, method, product or device.

Figure 1:
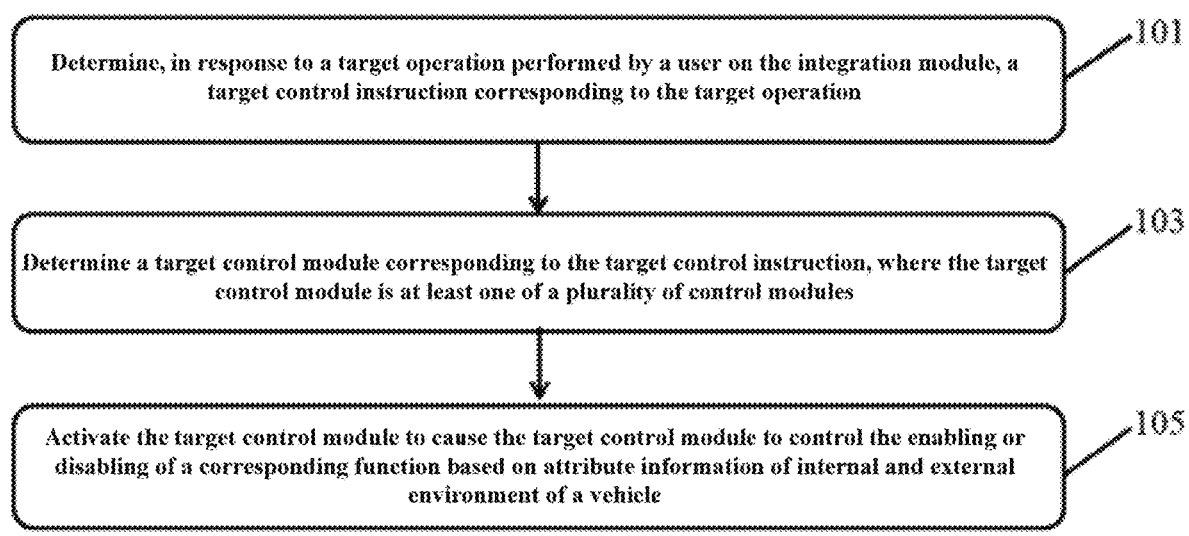
FIG. 1 is a schematic flowchart of a vehicle integrated control method provided by an embodiment of the present application.

FIG. 1 is a schematic flowchart of a vehicle integrated control method provided by an embodiment of the present application. The present specification provides operation steps of the method as described in the embodiments or the flow chart, but may include more or fewer operation steps based on conventional or uncreative labor. The sequence of steps listed in the embodiments is only one of many execution sequences of steps and does not represent the only execution sequence. In actual execution of a system or a server product, the steps may be executed sequentially or in parallel (for example, a parallel processor or multi-threaded processing environment) according to the methods shown in the embodiments or the accompanying drawings. The vehicle integrated control method provided in the present application may be used for a vehicle integrated control system. The vehicle integrated control method is used for the vehicle integrated control system, the vehicle integrated control system at least may include an integration module and a plurality of control modules, and the integration module is arranged in a vehicle. Specifically, as shown in FIG. 1, the method may include:

S101: determining, in response to a target operation performed by a user on the integration module, a target control instruction corresponding to the target operation;

S103: determining a target control module corresponding to the target control instruction, where the target control module is at least one of the plurality of control modules; and S105: activating the target control module to cause the target control module to control the enabling and disabling of a corresponding function based on attribute information of internal and external environment of the vehicle.

In the embodiment of the present application, the integration module may be a key in an air conditioning panel (such as an AUTO key of an automatic air conditioner) or a key on a central control screen. The key may be a physical key, or may be a virtual key.

In the embodiment of the present application, a mapping relationship among an operation, a control instruction, and a control module may be preset. When a user wants to activate a certain target control module to cause the target control module to control the enabling and disabling of a corresponding function based on attribute information of internal and external environment of the vehicle, a corresponding operation may be performed on the integration module based on the preset mapping relationship, where the target control module is at least one of the plurality of control modules.

In a feasible embodiment, the mapping relationship among the operation, the control instruction and the control module may be set as: pressing or touching the integration module a preset number of times, generating a corresponding target control instruction, and activating a corresponding target control module. Assuming that the control module includes three target control modules, a mapping relationship among touching or pressing the integration module once, a first control instruction, and a first target control module may be established; a mapping relationship among touching or pressing the integration module twice, a second control instruction, and a second target control module may be established; a mapping relationship among touching or pressing the integration module three times, a third control instruction, and a third target control module may be established; and a mapping relationship among touching or pressing the integration module four times, a fourth control instruction, and the first, second and third target control modules may be established, etc. When the integration module is touched or pressed once, the first target control instruction is generated, and the first target control module is activated, such that the first target control module controls the enabling or disabling of a corresponding function based on attribute information of internal and external environment of the vehicle; when the integration module is touched or pressed twice, the second target control instruction is generated, and the second target control module is activated, such that the second target control module controls the enabling or disabling of a corresponding function based on attribute information of internal and external environment of the vehicle; when the integration module is touched or pressed three times, the third target control instruction is generated, and the third target control module is activated, such that the third target control module controls the enabling or disabling of a corresponding function based on attribute information of internal and external environment of the vehicle; and when the integration module is touched and pressed four times, the fourth target control instruction is generated, and the first, second, and third target control modules are disabled simultaneously, etc. It should be noted that the establishment of the mapping relationship among the times of pressing or touching, the control instruction, and the control module is merely an example. The times of pressing or touching the integration module and the control module that is activated or disabled may be set based on different application scenarios. In addition, when the second target control module is in an activated state, the first target control module may still be in the activated state, or may be switched from the activated state to an original disabled state; and when the third target control module is in the activated state, the first and second target control modules may still be in the activated state, or may be switched d from the activated state to the original disabled state.

In another feasible embodiment, the mapping relationship among the operation, the control instruction and the control module may further be set as: continuously pressing or touching the integration module for a preset time, generating a corresponding target control instruction, and activating a corresponding target control module. Assuming that the control module includes three target control modules, a mapping relationship among continuously pressing or touching the integration module for three seconds, a first control instruction, and a first target control module may be established; a mapping relationship among continuously pressing or touching the integration module for five seconds, a second control instruction, and a second target control module may be established; a mapping relationship among continuously pressing or touching the integration module for eight seconds, a third control instruction, and a third target control module may be established; and a mapping relationship among continuously pressing or touching the integration module for 15 seconds, a fourth control instruction, and the first, second and third target control modules may be established. When the integration module is continuously pressed or touched for three seconds, the first target control instruction is generated, and the first target control module is activated; when the integration module is continuously pressed or touched for five seconds, the second target control instruction is generated, and the second target control module is activated; when the integration module is continuously pressed or touched for eight seconds, the third target control instruction is generated, and the third target control module is activated; and when the integration module is continuously pressed or touched for 15 seconds, the fourth target control instruction is generated, and the first, second, and third target control modules are disabled simultaneously, etc. The duration of pressing or touching (three seconds, five seconds, and 8 seconds) described above is merely for the purpose of description, rather than limiting the scope of protection of the present invention. It should be noted that the establishment of the mapping relationship among the duration of pressing or touching, the control instruction, and the control module is merely an example. The duration of pressing or touching and the control module that is activated or disabled may be set based on different application scenarios. In addition, when the second target control module is in an activated state, the first target control module may still be in the activated state, or may be switched from the activated state to an original disabled state; and when the third target control module is in the activated state, the first and second target control modules may still be in the activated state, or may be switched d from the activated state to the original disabled state.

In another feasible embodiment, the times of pressing or touching and duration of pressing or touching may be combined to establish a mapping relationship among an operation, a control instruction, and a control module. Assuming that the control module includes three target control modules, a mapping relationship among touching or pressing the integration module once, a first control instruction, and a first target control module may be established; a mapping relationship among touching or pressing the integration module twice, a second control instruction, and a second target control module may be established; a mapping relationship among touching or pressing the integration module three times, a third control instruction, and a third target control module may be established; and a mapping relationship among continuously pressing or touching the integration module for a preset time, a fourth control instruction, and the first, second and third target control modules may be established. When the integration module is touched or pressed once, the first target control instruction is generated, and the first target control module is activated; when the integration module is touched or pressed twice, the second target control instruction is generated, and the second target control module is activated; when the integration module is touched or pressed three times, the third target control instruction is generated, and the third target control module is activated; and when the integration module is continuously touched or pressed for the preset time, the fourth target control instruction is generated, and the first, second and third target control modules are disabled simultaneously, etc.

Figure 2:
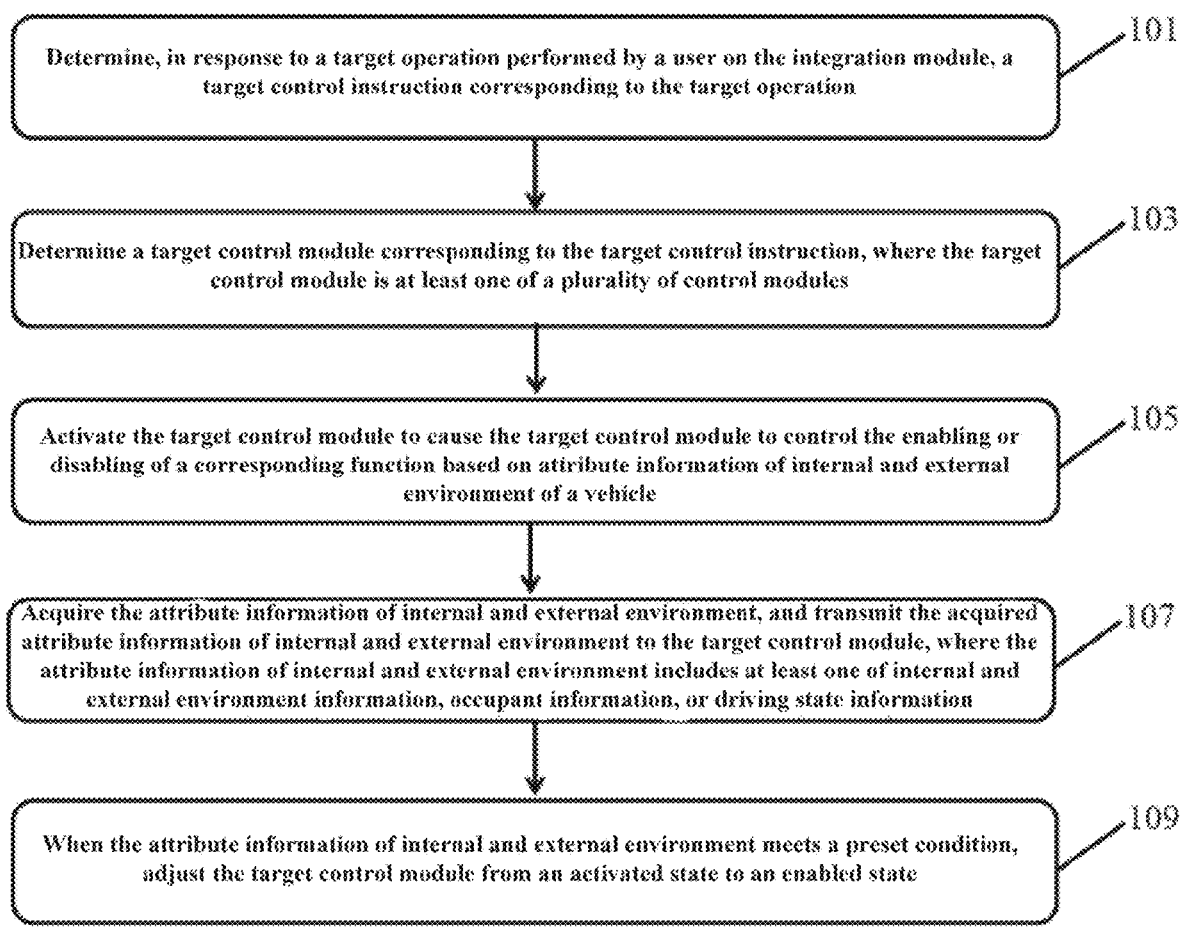
FIG. 2 is a schematic flowchart of another vehicle integrated control method provided by an embodiment of the present application.

In the embodiment of the present application, as shown in FIG. 2, after S105, the method may further include:
S107: acquiring the attribute information of internal and external environment, and transmitting the acquired attribute information of internal and external environment to the target control module, where the attribute information of internal and external environment includes at least one of internal and external environment information, occupant information, or driving state information; and
S109: when the attribute information of internal and external environment meets a preset condition, adjusting the target control module from an activated state to an enabled state.

In the embodiment of the present application, when a corresponding operation is performed on the integration module, only a corresponding target control module is activated, that is, the target control module is in an automatic control state, and then it is also necessary to determine whether to enable the target control module in an activated state based on the acquired attribute information of the internal and external environment of the vehicle (including at least one of internal and external environment information, occupant information, or driving state information), and to transmit the acquired attribute information of the internal and external environment to the target control module, such that the target control module controls the enabling or disabling of a corresponding function based on the attribute information of internal and external environment. For example, a preset condition may be set, and when the attribute information of internal and external environment meets the preset condition, the target control module is adjusted from an activated state to an enabled state, and the corresponding function is controlled to be enabled or disabled through the target control module in the enabled state based on the acquired attribute information of internal and external environment; and when the attribute information of internal and external environment does not meet the preset condition, the activated state of the target control module is maintained, the target control module is made to continue to adopt a current strategy of the vehicle to control the vehicle, and meanwhile the attribute information of internal and external environment is continuously monitored; once it is monitored that the attribute information of internal and external environment meets the preset condition, the target control module is immediately switched from the activated state to the enabled state, such that the target control module controls the enabling or disabling of the corresponding function based on the attribute information of internal and external environment. It can be seen that, in the embodiment of the present application, it is not to enable the corresponding target control module immediately after receiving the target operation performed by the user on the integration module, but to activate the corresponding target control module first, and then to further judge whether the target control module needs to be enabled based on at least one of the internal and external environment information, the occupant information, or the driving state information. Thus, the probability of the target control module being enabled mistakenly and the costs are reduced, and the enabling accuracy is improved.

As described above, the present application may automatically control a plurality of functions through one integration module. Since the plurality of functions are controlled through one integration module, on the one hand, the defect that each function (i.e. a control module) is provided with a control panel or a key, and when the user enables different functions, the user needs to manually press different keys is avoided, thereby improving user convenience; on the other hand, replacing the traditional different keys with one integration module has the advantages of low manufacturing cost, simple operation interface and high intelligence.

In the embodiment of the present application, in order to facilitate a user to perceive a currently activated target control module and improve intelligence of controlling a plurality of functions, and user comfort and experience, the vehicle integrated control system further includes a prompt module respectively corresponding to each control module, the prompt module is integrally arranged on the integration module, and the method may further include:
determining, in response to the target operation performed by the user on the integration module, a prompt module corresponding to the target operation; and enabling the prompt module corresponding to the target control instruction, where the prompt module includes at least one of an optical module, a sound module, a text module, an image module or a symbol module.

In the embodiment of the present application, a mapping relationship between an operation and a prompt module may further be established in advance, for example, a mapping relationship between pressing or touching the integration module a preset number of times (or duration of continuously pressing or touching the integration module) and a prompt module is established. For a specific mapping relationship establishment process, reference may be made to an establishment process of a mapping relationship among an operation, a control instruction, and a control module, and details are not described herein again.

Figure 3:
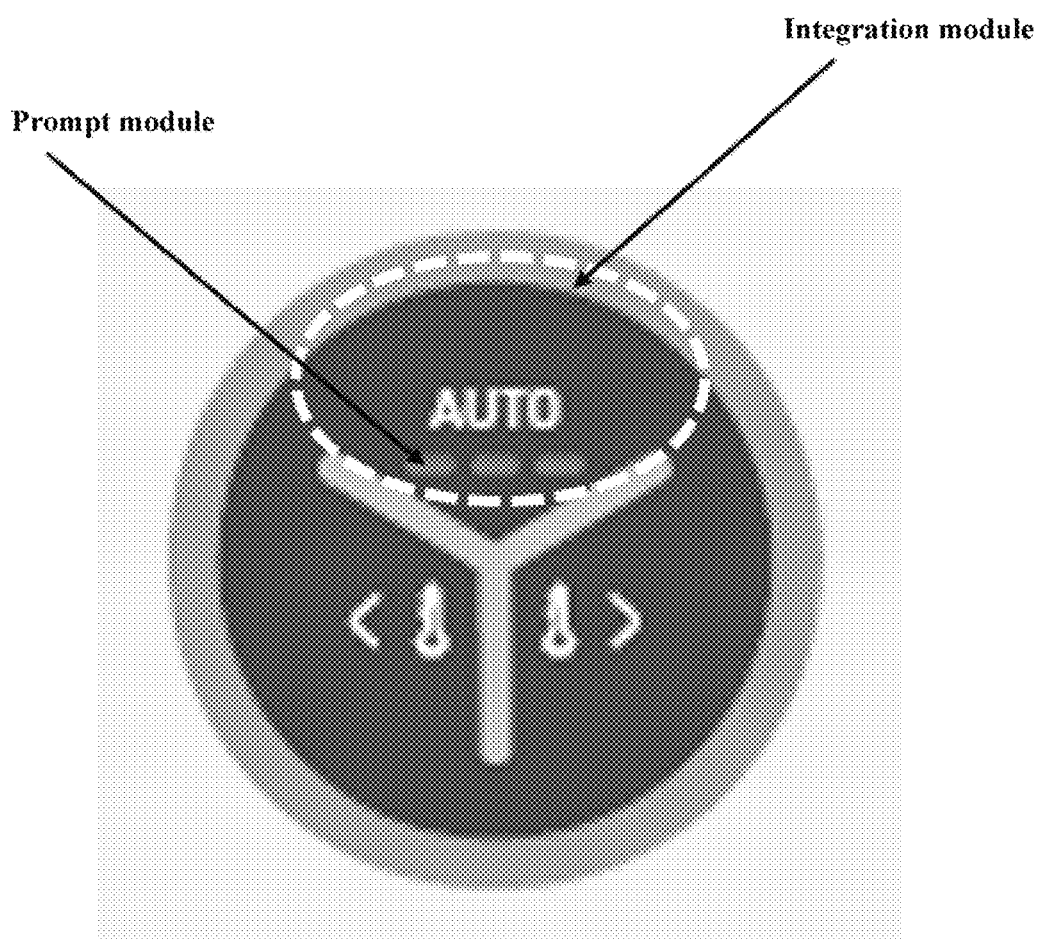
FIG. 3 is a schematic structural diagram of a prompt module provided by an embodiment of the present application.

FIG. 3 is a schematic structural diagram of a prompt module being an optical module, and as shown in FIG. 3, in order to reduce costs and the aesthetics of a control interface, the optical module may be integrally arranged on the integration module. Certainly, in some other scenarios, the optical module may alternatively be arranged on other positions of a central control screen.

In a feasible embodiment, the optical module may be an indicator light, and a corresponding indicator light may be preset for each control module.

In practical applications, in order to facilitate a user to better perceive the currently activated or enabled target control module based on an enabled indicator light, and to further improve intelligence, and user comfort and experience, different colors may also be set for indicator lights corresponding to different target control modules.

In another feasible embodiment, in order to facilitate a user to better perceive the currently activated target control module, and to further improve intelligence, and user comfort and experience, the prompt module may also be a text module, an image module, a symbol module, etc. Taking the prompt module being the text module as an example, if the control module includes an air conditioning automatic control module, a seat heating and ventilation module, and an air purification and sterilization module, the corresponding prompt module may be text such as "air conditioner", "seat" and "purification and sterilization", and when an operation performed by a user on the integration module is received, the corresponding text module is enabled based on the mapping relationship. Taking the prompt module being the image module as an example, if the control module includes an air conditioning automatic control module, a seat heating and ventilation module, and an air purification and sterilization module, the corresponding prompt module may be an image corresponding to the air conditioner, an image corresponding to the seat, and an image corresponding to the purification and sterilization, and when an operation performed by a user on the integration module is received, the corresponding image module is enabled based on the mapping relationship. Taking the prompt module being the sound module as an example, if the control module includes an air conditioning automatic control module, a seat heating and ventilation module, and an air purification and sterilization module, the corresponding prompt module may be voices such as "air conditioner", "seat" and "purification and sterilization", and when an operation performed by a user on the integration module is received, the corresponding sound module is enabled based on the mapping relationship.

Normally, the prompt module is in a disabled state, and when an operation performed by a user on the integration module is received, the corresponding prompt module is controlled to be enabled, that is, the corresponding prompt module is lighted up. In order to reduce costs and the aesthetics of a control interface, the prompt module may be integrally arranged on the integration module. Of course, in some other scenarios, the prompt module may alternatively be arranged on the other positions of a central control screen.

In practical applications, the corresponding prompt module may be enabled only when the target control module is in the enabled state. Alternatively, when the target control module is in the activated state and/or the enabled state, the enabled state of the prompt module may be maintained.

In another feasible embodiment, in order to facilitate a user to perceive the currently activated target control module and improve intelligence of controlling a plurality of functions, and user comfort and experience, the vehicle integrated control system further includes one prompt module corresponding to the plurality of control modules, the prompt module is integrally arranged on the integration module, and the method may further include:

in response to the target operation performed by the user on the integration module, determining a prompt mode corresponding to the target operation; and enabling the prompt module and controlling the prompt module to prompt according to the prompt mode, such that the prompt module presents a state corresponding to the prompt mode, where the prompt module includes an optical module, a sound module, a text module, an image module or a symbol module.

In this embodiment, a mapping relationship between an operation and a prompt mode may be established in advance, for example, a mapping relationship between pressing or touching the integration module a preset number of times (or continuously pressing or touching the integration module for a preset time) and a corresponding prompt mode is established. For a specific mapping relationship establishment process, reference may be made to an establishment process of a mapping relationship among an operation, a control instruction, and a control module, and details are not described herein again.

In the following, S301 to S303 are described by taking the prompt module being an indicator light and the prompt mode being a color as an example: assuming that the control module includes an air conditioning automatic control module, a seat heating and ventilation module, and an air purification and sterilization module, and then a mapping relationship among pressing or touching the integration module once, a red prompt mode, and the air conditioning automatic control module may be established; a mapping relationship among pressing or touching the integration module twice, a yellow prompt mode, and the seat heating and ventilation module may be established; and a mapping relationship among pressing or touching the integration module three times, a blue prompt mode, and the air purification and sterilization module may be established. When a user presses or touches the integration module once, it is determined that a prompt mode of the indicator light is red based on the described mapping relationship, and then the indicator light is enabled so as to prompt according to the corresponding prompt mode (namely, enabling the indicator light to present red), such that the user perceives that what is currently activated is the air conditioning automatic control module; when the user presses or touches the integration module twice, it is determined that a prompt mode of the indicator light is yellow based on the described mapping relationship, and then the indicator light is enabled so as to prompt according to the corresponding prompt mode (namely, enabling the indicator light to present yellow), such that the user perceives that what is currently activated is the seat heating and ventilation module; when the user presses or touches the integration module three times, it is determined that a prompt mode of the indicator light is blue based on the described mapping relationship, and then the indicator light is enabled so as to prompt according to the corresponding prompt mode (namely, enabling the indicator light to present blue), such that the user perceives that what is currently activated is the air purification and sterilization module. The above prompt modes of red, yellow, and blue are merely for illustrative purposes, and are not intended to limit the scope of protection of the present invention. In some other embodiments, other colors or combinations of colors may also be used. It should be noted that, when the seat heating and ventilation module is in an activated state, the air conditioning automatic control module may still be in the activated state, or may be switched from the activated state to an original disabled state; and when the air purification and sterilization module is in the activated state, the air conditioning automatic control module and the seat heating and ventilation modules may still be in the activated state, or may be switched d from the activated state to the original disabled state.

In the following, S301 to S303 are described by taking the prompt module being a text module and the prompt mode being a text type as an example: assuming that the control module includes an air conditioning automatic control module, a seat heating and ventilation module, and an air purification and sterilization module, and then a mapping relationship among pressing or touching the integration module once, a prompt mode being the text "air conditioner", and the air conditioning automatic control module may be established; a mapping relationship among pressing or touching the integration module twice, a prompt mode being the text "seat", and the seat heating and ventilation module may be established; and a mapping relationship among pressing or touching the integration module three times, a prompt mode being the text "purification and sterilization", and the air purification and sterilization module may be established. When a user presses or touches the integration module once, it is determined that a prompt mode is the text "air conditioner" based on the described mapping relationship, and then the prompt module is enabled so as to prompt according to the corresponding prompt mode (namely, enabling the prompt module to display the text "air conditioner"), such that the user perceives that what is currently activated is the air conditioning automatic control module; when the user presses or touches the integration module twice, it is determined that a prompt mode is the text "seat" based on the described mapping relationship, and then the prompt module is enabled so as to prompt according to the corresponding prompt mode (namely, enabling the prompt module to display the text "seat"), such that the user perceives that what is currently activated is the seat heating and ventilation module; when the user presses or touches the integration module three times, it is determined that a prompt mode is the text "sterilization and purification" based on the described mapping relationship, and then the prompt module is enabled so as to prompt according to the corresponding prompt mode (namely, enabling the prompt module to display the text "sterilization and purification"), such that the user perceives that what is currently activated is the air purification and sterilization module.

In another feasible embodiment, a plurality of control modules at least may include an air conditioning automatic control module, a seat heating and ventilation module, and an air purification and sterilization module. Then a mapping relationship among an operation, an instruction, a control module, and a prompt module may be preset. For example, touching or pressing the integration module once is set to generate a first target control instruction, activate the air conditioning automatic control module, and enable the corresponding prompt module; touching or pressing the integration module twice is set to generate a second target control instruction, activate the seat heating and ventilation module, and enable the corresponding prompt module; and touching or pressing the integration module three times is set to generate a third target control instruction, activate the air purification and sterilization module, and enable the corresponding prompt module.

Figure 4:
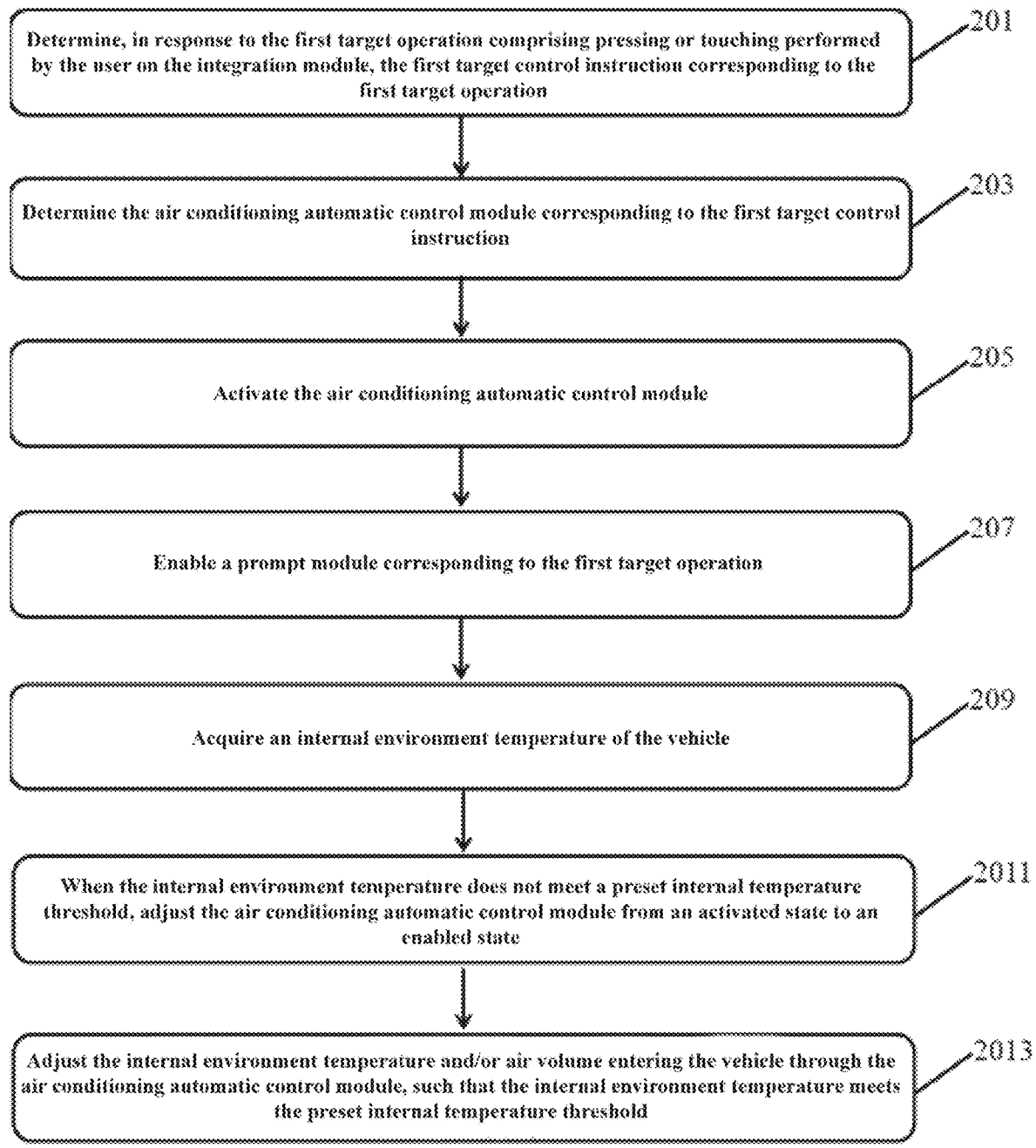
FIG. 4 is a schematic flowchart of another vehicle integrated control method provided by an embodiment of the present application.

Accordingly, when a user enables one of the control modules through the integration module, taking enabling the air conditioning automatic control module as an example, the target operation includes a first target operation, the target control instruction may further include a first target control instruction, the attribute information of internal and external environment includes the internal and external environment information, and the internal and external environment information includes an internal environment temperature. As shown in FIG. 4, the method may further include:

S201: determining, in response to the first target operation comprising pressing or touching performed by the user on the integration module, the first target control instruction corresponding to the first target operation;

S203: determining the air conditioning automatic control module corresponding to the first target control instruction;

S205: activating the air conditioning automatic control module;

S207: enabling the prompt module corresponding to the first target operation;

S209: acquiring an internal environment temperature of the vehicle;

S2011: when the internal environment temperature does not meet a preset internal temperature threshold, adjusting the air conditioning automatic control module from an activated state to an enabled state; and S2013: adjusting the internal environment temperature and/or air volume entering the vehicle through the air conditioning automatic control module, such that the internal environment temperature meets the preset internal temperature threshold.

Figure 5:
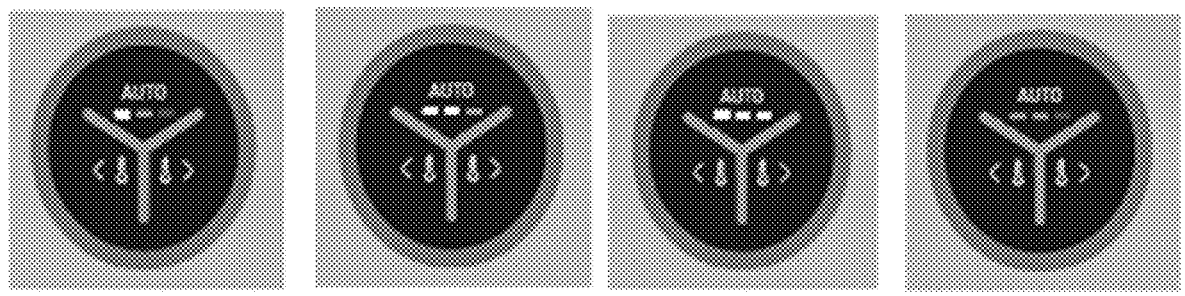
FIG. 5 is a schematic diagram of controlling a prompt module provided by an embodiment of the present application.
Figure 6:
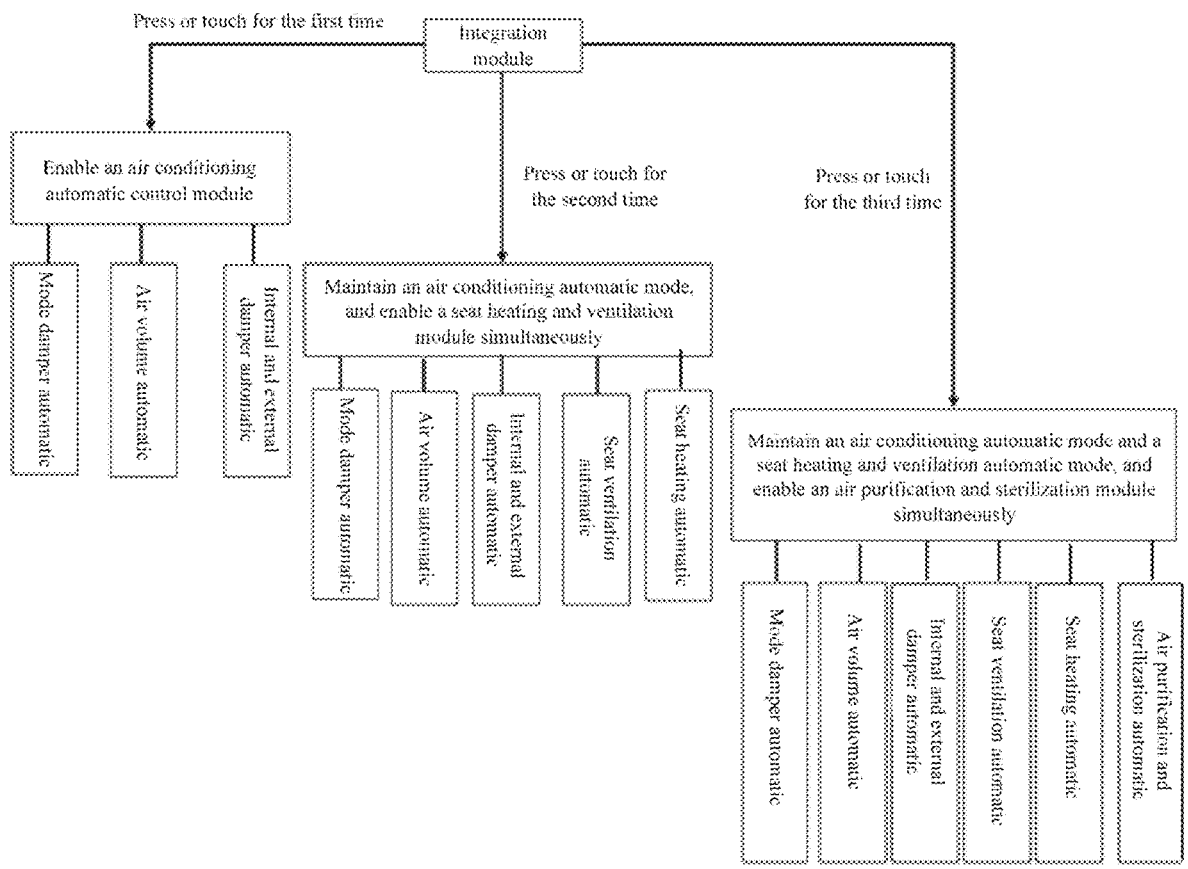
FIG. 6 is a logic block diagram of a vehicle integrated control method provided by an embodiment of the present application.

FIG. 5 is a schematic diagram of controlling a prompt module provided by an embodiment of the present application, and FIG. 6 is a logic block diagram of a vehicle integrated control method provided by an embodiment of the present application. In practical applications, when a user wants to enable an air conditioning automatic control module, the integration module may be pressed or touched once (i.e. pressing or touching for the first time, i.e. a first target operation) to form a first target control instruction, the air conditioning automatic control module corresponding to the first target control instruction is activated, and the prompt module corresponding to the first target operation is lighted up simultaneously. At the same time, the internal environment temperature of the vehicle is acquired to judge whether the internal environment temperature meets the preset internal temperature threshold, if so, the air conditioning automatic control module is not enabled, the activated state thereof is maintained, and a current automatic air conditioning control strategy is used to control the vehicle; if not, it indicates that the internal temperature of the vehicle needs to be adjusted, then the air conditioning automatic control module may be switched from the activated state to the enabled state, and a target air conditioning automatic control strategy corresponding to the air conditioning automatic control module (including, but not limited to, internal and external dampers automatic, air volume automatic, mode damper automatic, etc.) is determined based on the acquired internal environment temperature, and finally, the internal environment temperature and/or the air volume entering the vehicle are/is adjusted through the target air conditioning automatic control strategy, such that the internal environment temperature meets the preset internal temperature threshold.

Figure 7:
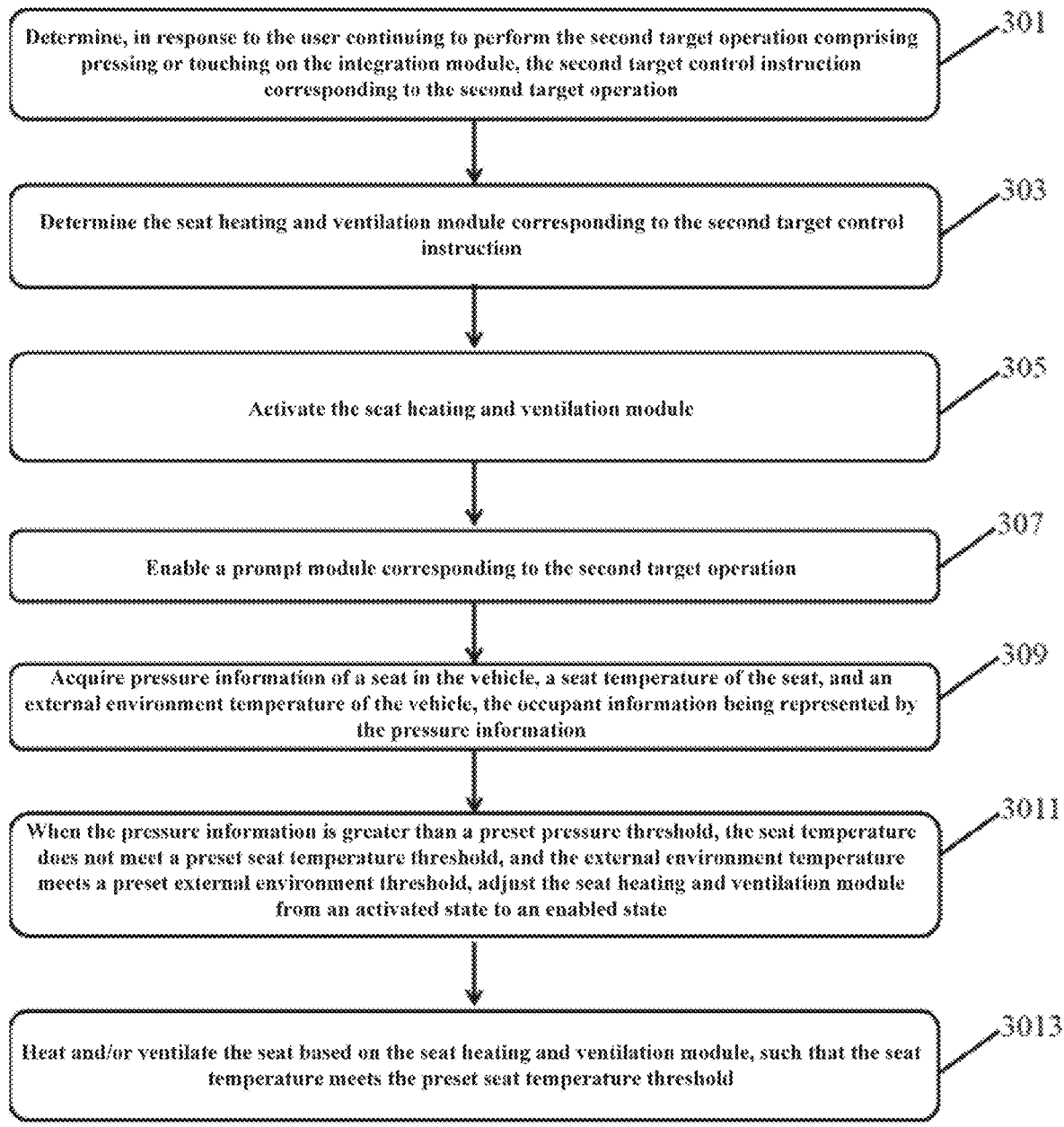
FIG. 7 is a schematic flowchart of another vehicle integrated control method provided by an embodiment of the present application.

Accordingly, when the user wants to continue to enable a second control module, taking enabling the seat heating and ventilation module as an example, the target operation may further include a second target operation, the target control instruction may further include a second target control instruction, the attribute information of internal and external environment includes the internal and external environment information and the occupant information, and the internal and external environment information includes an external environment temperature. Then as shown in FIG. 7, the method may further include:

S301: determining, in response to the user continuing to perform the second target operation comprising pressing or touching on the integration module, the second target control instruction corresponding to the second target operation;

S303: determining the seat heating and ventilation module corresponding to the second target control instruction;

S305: activating the seat heating and ventilation module;

S307: enabling the prompt module corresponding to the second target operation;

S309: acquiring pressure information of a seat in the vehicle, a seat temperature of the seat, and an external environment temperature of the vehicle, the occupant information being represented by the pressure information;

S3011: when the pressure information is greater than a preset pressure threshold, the seat temperature does not meet a preset seat temperature threshold, and the external environment temperature meets a preset external environment threshold, adjusting the seat heating and ventilation module from an activated state to an enabled state; and S3013: heating and/or ventilating the seat based on the seat heating and ventilation module, such that the seat temperature meets the preset seat temperature threshold.

As shown in FIG. 5 and FIG. 6, in practical applications, when the user wants to continue to enable the seat heating and ventilation module on the basis of maintaining the air conditioning automatic control module enabled, the integration module may be pressed or touched once more (i.e. pressing or touching for the second time, i.e. a second target operation) on the basis of S201 to form a second target control instruction, the seat heating and ventilation module corresponding to the second target control instruction is activated, and the prompt module corresponding to the second target operation is lighted up simultaneously. At the same time, pressure information of a seat, a seat temperature of the seat, and an external environment temperature of the vehicle are acquired, when the pressure information is greater than the preset pressure threshold (namely, there is an occupant on the seat), the seat temperature does not meet the preset seat temperature threshold, and the external environment temperature meets the preset external environment threshold (for example, if the external temperature is 0° C. and the seat temperature is 4° C., the seat temperature is too low to meet warming requirement of the occupant; for another example, if the external temperature is 30° C. and the seat temperature is 25° C., the seat temperature is too high to meet cooling requirement of the occupant), it indicates that the seat temperature needs to be adjusted at this time, the seat heating and ventilation module may be switched from an activated state to an enabled state, and a target heating and ventilation strategy corresponding to the seat heating and ventilation module is determined based on the acquired pressure information of the seat in the vehicle, the seat temperature of the seat, and the external environment temperature of the vehicle, where the target heating and ventilation strategy includes, but is not limited to, a heating time, a heating gear, a ventilation time, a ventilation gear, etc. (for example, when the external temperature is 0° C. and the seat temperature is 4° C., the seat is heated in a third gear for 20 minutes; and when the external temperature is 30° C. and the seat temperature is 25° C., the seat is ventilated and cooled for 10 minutes, etc.). Finally, the seat is heated and/or ventilated through the heating and ventilation strategy, such that the seat temperature meets the preset seat temperature threshold.

When the pressure information is less than or equal to the preset pressure threshold (namely, there is no occupant on the seat) or the seat temperature meets the preset seat temperature threshold, it indicates that the seat temperature does not need to be adjusted at this time, and then the activated state of the seat heating and ventilation module may be maintained, and a current seat control strategy is used to control the seat.

Figure 8:
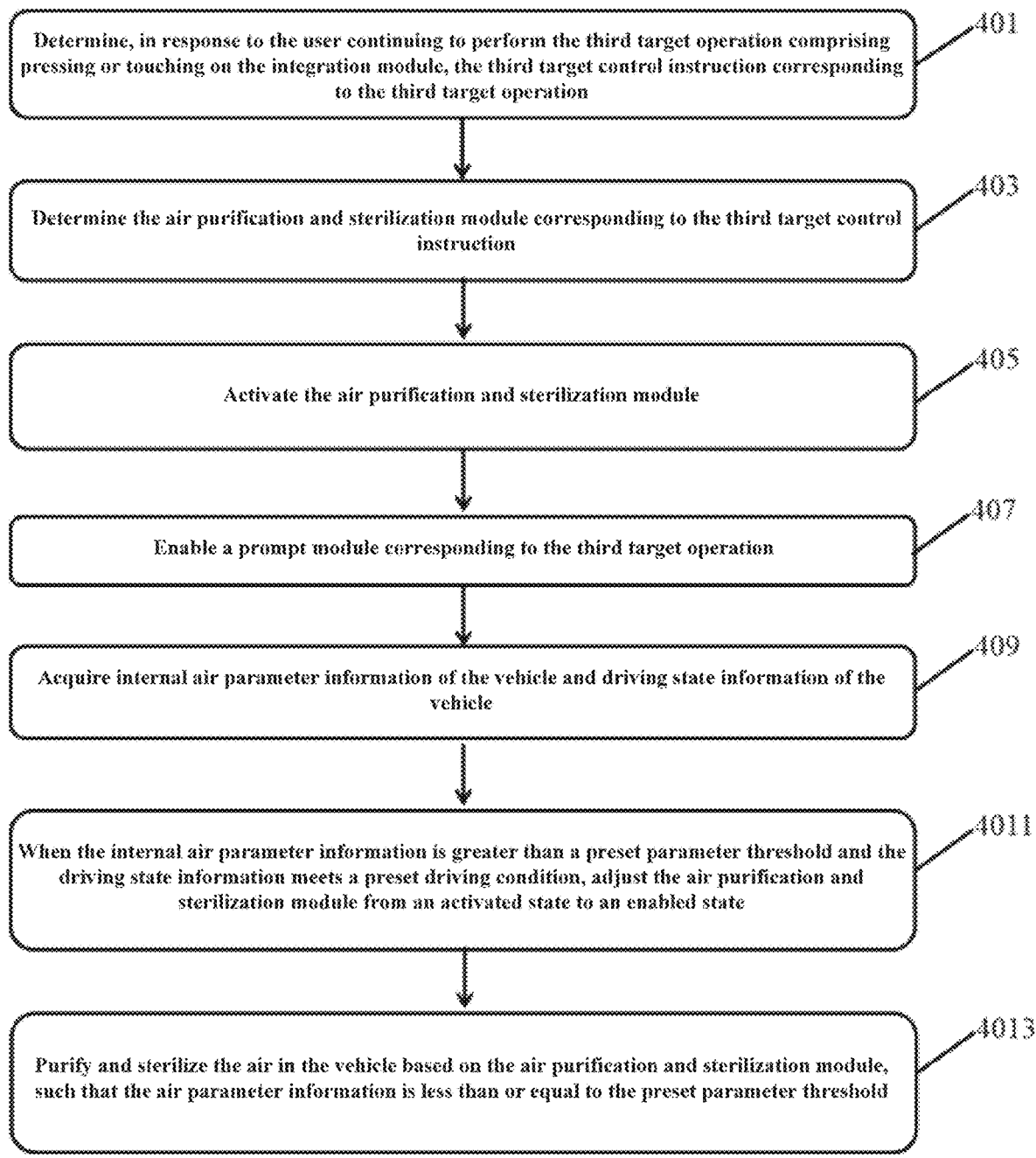
FIG. 8 is a schematic flowchart of another vehicle integrated control method provided by an embodiment of the present application.

Accordingly, when the user wants to continue to enable a third control module, taking the third control module being the air purification and sterilization module as an example, the target operation may further include a third target operation, the target control instruction further includes a third target control instruction, the attribute information of internal and external environment includes the internal and external environment information and the driving state information, and the internal and external environment information includes internal air parameter information of the vehicle. Then as shown in FIG. 8, the method may further include:

S401: determining, in response to the user continuing to perform the third target operation comprising pressing or touching on the integration module, the third target control instruction corresponding to the third target operation;

S403: determining the air purification and sterilization module corresponding to the third target control instruction;

S405: activating the air purification and sterilization module;

S407: enabling the prompt module corresponding to the third target operation;

S409: acquiring internal air parameter information of the vehicle and driving state information of the vehicle;

S4011: when the internal air parameter information is greater than a preset parameter threshold and the driving state information meets a preset driving condition, adjusting the air purification and sterilization module from an activated state to an enabled state; and S4013: purifying and sterilizing the air in the vehicle based on the air purification and sterilization module, such that the air parameter information is less than or equal to the preset parameter threshold.

As shown in FIG. 5 and FIG. 6, in practical applications, when the user wants to continue to enable the air purification and sterilization module on the basis of maintaining the air conditioning automatic control module and seat heating and ventilation module enabled, the integration module may be pressed or touched once more (namely, pressing or touching for the third time, and namely, a third target operation) on the basis of S301 to form a third target control instruction, the air purification and sterilization module corresponding to the third target control instruction is activated, and the prompt module corresponding to the third target operation is lighted up simultaneously. At the same time, internal air parameter information of the vehicle and driving state information of the vehicle are acquired, when the internal air parameter information is greater than the preset parameter threshold (namely, air quality is too poor, PM2.5 content is too high, virus content is too high, etc.) and the driving state information meets the preset driving condition (for example, driving state meets the preset condition, driving time meets the preset condition, driving speed meets the preset condition, etc.), the air purification and sterilization module may be switched from an activated state to an enabled state, and a target purification and sterilization strategy corresponding to the air purification and sterilization module is determined based on the acquired internal air parameter information, pressure information, and driving state information, and the air in the vehicle is purified and sterilized through the purification and sterilization strategy of the target air purification and sterilization module, such that the air parameter information is less than or equal to the preset parameter threshold. An air parameter information acquisition module includes, but is not limited to, an Abstract Queued Synchronized (AQS) sensor, and a PM2.5 sensor; the air purification and sterilization module includes, but is not limited to, at least one of an aroma substance generation apparatus, a negative ion generator, an ultraviolet lamp or an infrared lamp; and the purification and sterilization strategy includes, but is not limited to, the type of the air purification and sterilization module, and an enabling time thereof, etc. For example, when an information processing module determines that the concentration of pungent odor or unpleasant gas in the vehicle is relatively high, the purification and sterilization strategy may be: enabling the aroma substance generation apparatus for a first preset time, such that aroma is emitted from the aroma substance generation apparatus, thereby purifying air in the vehicle and improving the smell in the vehicle; when the information processing module determines that the PM2.5 content in the vehicle is too high, the purification and sterilization strategy may be: enabling the negative ion generator for a second preset time, such that negative ions are released from the negative ions generator, thereby dedusting, sterilizing, and purifying the air in the vehicle; when the information processing module determines that the virus content in the vehicle exceeds a standard, the purification and sterilization strategy may be: enabling the ultraviolet lamp and/or infrared lamp for a third preset time, such that the air in the vehicle is purified and sterilized by the ultraviolet lamp and the infrared lamp, etc.; when the information processing module determines that the concentration of pungent odor or unpleasant gas in the vehicle is relatively high and the PM2.5 content in the vehicle is too high, the purification and sterilization strategy may be: enabling the aroma substance generation apparatus for the first preset time and the negative ion generator for the second preset time; and when the information processing module determines that the concentration of pungent odor or unpleasant gas in the vehicle is relatively high, the PM2.5 content in the vehicle is too high, and the virus content in the vehicle exceeds the standard, the purification and sterilization strategy may be: enabling the aroma substance generation apparatus for the first preset time, the negative ion generator for the second preset time, and the ultraviolet lamp and/or infrared lamp for the third preset time.

It should be noted that, since the ultraviolet lamp and/or infrared lamp is harmful to human body, before it is determined to enable the ultraviolet lamp and/or infrared lamp, it is also necessary to judge whether there is an occupant in the vehicle, and only when it is determined that there is no occupant in the vehicle (for example, the pressure information of the seat is less than or equal to the preset pressure threshold), the ultraviolet lamp and/or infrared lamp is enabled; and when it is determined there is an occupant in the vehicle (for example, the pressure information of the seat is greater than the preset pressure threshold), the ultraviolet lamp and/or infrared lamp is not enabled.

When the internal air parameter information is less than or equal to the preset parameter threshold or the driving state information meets the preset driving condition, it indicates that it is not necessary to sterilize and purify the air in the vehicle at this time, the activated state of the air purification and sterilization module may be maintained, and a current air sterilization strategy is used to sterilize and purify the air.

In the embodiment of the present invention, in order to further improve intelligence of controlling various of control modules and a user experience, and facilitate 'user's operation, the method may further include:

determining, in response to the user continuing to perform a fourth target operation comprising pressing or touching on the integration module, a fourth target control instruction corresponding to the fourth target operation;

determining the air conditioning automatic control module, the seat heating and ventilation module, and the air purification and sterilization module corresponding to the fourth target control instruction; and disabling the air conditioning automatic control module, the seat heating and ventilation module, and the air purification and sterilization module.

In practical applications, a disabled instruction corresponding to each control module may be preset. For example, touching or pressing the integration module four times to generate a fourth target control instruction is set and the fourth target control instruction is used to disable a plurality of control modules simultaneously.

Taking the plurality of control modules including the air conditioning automatic control module, the seat heating and ventilation module, and the air purification and sterilization module as an example, when the user wants to disable the plurality of control modules (such as the air conditioning automatic control module, the seat heating and ventilation module, and the air purification and sterilization module), the integration module may be pressed or touched once more (namely, pressing or touching for the fourth time, and namely, a fourth target operation) on the basis of S401 to form the fourth target control instruction, the air conditioning automatic control module, the seat heating and ventilation module, and the air purification and sterilization module corresponding to the fourth target control instruction are disabled, and the corresponding prompt module is disabled simultaneously.

Certainly, in practical applications, other forms of disabling instructions may also be set, for example, triggering the integration module four times, and disabling the air conditioning automatic control module individually; triggering the integration module five times, and disabling the seat heating and ventilation module individually; and triggering the integration module six times, and disabling the air purification and sterilization module individually, etc.

To sum up, in a feasible embodiment, one prompt module is lighted up, indicating that one function is activated or enabled; two prompt modules are lighted up, indicating that two functions are activated or enabled; three prompt modules are lighted up, indicating that three function are activated or enabled; and three prompt modules are all turned off, indicating that three function modules are all disabled.

In another feasible embodiment, in order to heat/cool the inside of the vehicle in advance, or heat/cool the seat in the vehicle in advance, or sterilize the air in the vehicle in advance before a user travels, such that when the user gets on the vehicle, the vehicle may be started directly, thereby further improving intelligence of controlling various of control modules and a user experience, and facilitating user's operation, the integration module may also be controlled by means of a remote control method. Specifically, the vehicle integrated control system further includes a terminal device of a user corresponding to the vehicle, and the integration module is wirelessly connected to the terminal device, and then determining, in response to a target operation performed by a user on the integration module, a target control instruction corresponding to the target operation may further includes:

receiving a remote control instruction sent by the terminal device to the integration module;

determining a target operation corresponding to the remote control instruction; and determining a target control instruction corresponding to the target operation.

In practical applications, a connection relationship between the terminal device and the integration control device may be preset, where the connection relationship may be a wireless communication connection. A mapping relationship among a remote control instruction, an operation, a control instruction, and a control module may also be preset. If a user is not in a vehicle, a target operation corresponding to the remote control instruction is determined based on the mapping relationship, then a target control instruction corresponding to the target operation is determined based on the mapping relationship, and finally, a target control module corresponding to the target control instruction is determined based on the mapping relationship and is activated. For example, a corresponding remote control interface may be set on the terminal device, and a remote control integrated key is arranged on the remote control interface. The remote control integrated key is triggered or pressed once to form a first target operation performed on the integration module, generate a first target control instruction, and activate the air conditioning automatic control module; the remote control integrated key is triggered or pressed twice to form a second target operation performed on the integration module, generate a second target control instruction, and activate the seat heating and ventilation module; and the remote control integrated key is triggered or pressed three times to form a third target operation performed on the integration module, generate a third target control instruction, and activate the air purification and sterilization module.

In a feasible embodiment, in order to further improve intelligence of controlling various of control modules, a user experience and accuracy of controlling and processing, the vehicle integrated control system further includes a terminal device of a user corresponding to the vehicle, and after adjusting the target control module from an activated state to an enabled state when the attribute information of internal and external environment meets the preset condition, the method may include:

determining a target control strategy corresponding to the target control module;

sending the target control strategy to the terminal device module;

when receiving an instruction for executing the target control strategy triggered by the user based on the terminal device, controlling the enabling or disabling of a corresponding function through the target control strategy; and when receiving an instruction for not executing the target control strategy triggered by the user based on the terminal device module, prohibiting control on the enabling or disabling of a corresponding function through the target control strategy.

In practical applications, when a corresponding function is controlled by the target control module, a target control strategy corresponding to the target control module may also be sent to the terminal device in a wireless communication manner. Whether the target control strategy meets the actual user requirements is checked by the user in the terminal device, if the user requirements are met, the user triggers an instruction for determining to execute the target control strategy on the remote control interface of the terminal device, and only when an execution instruction triggered by the user is received, the corresponding function is controlled through the target control module; and if the user finds that the target control strategy does not meet the user requirements after checking, the user may not trigger an instruction for executing the target control strategy on the remote control interface, and the corresponding function controlled through the target control module is not entered. The present application adds a step of remotely judging by a user whether to perform a next operation before controlling a corresponding function through the target control module, which has high intelligence and a better user experience, and can avoid misjudgment of a vehicle caused by a system determination error and improve the accuracy of controlling a corresponding function through the target control module.

The vehicle integrated control method provided by the embodiments of the present application has the following beneficial effects:

1) The embodiments of the present application automatically control a plurality of functions through one integration module. Since the plurality of functions are controlled through one integration module, it is avoided to provide a control panel or a key for each function, simplifying an operation interface and having low cost and high intelligence.

2) The embodiments of the present application automatically control a plurality of functions through one integration module. When a user uses different functions, the user does not need to manually press different keys, which is convenient to use and effectively improves user convenience and user experience.

3) The embodiments of the present application may further provide a corresponding prompt module for each control module, and when the control module is activated or enabled, the prompt module is lighten up. The prompt module can facilitate a user to perceive a currently enabled function, thereby improving the intelligence of controlling a plurality of functions, user comfort and experience.

5) The embodiments of the present application may further send a remote control instruction to the integration module in a remote control manner, so as to perform intelligent control on the plurality of functions through the integration control module, thereby further improving the intelligence of controlling various of control modules, user convenience, and user experience.

6) The embodiments of the present application add a step of remotely judging by a user whether to perform a next operation before controlling a corresponding function through the target control module, which has high intelligence and a better user experience, and can avoid misjudgment of a vehicle caused by a system determination error and improve the accuracy of controlling a corresponding function through the target control module.

Figure 9:
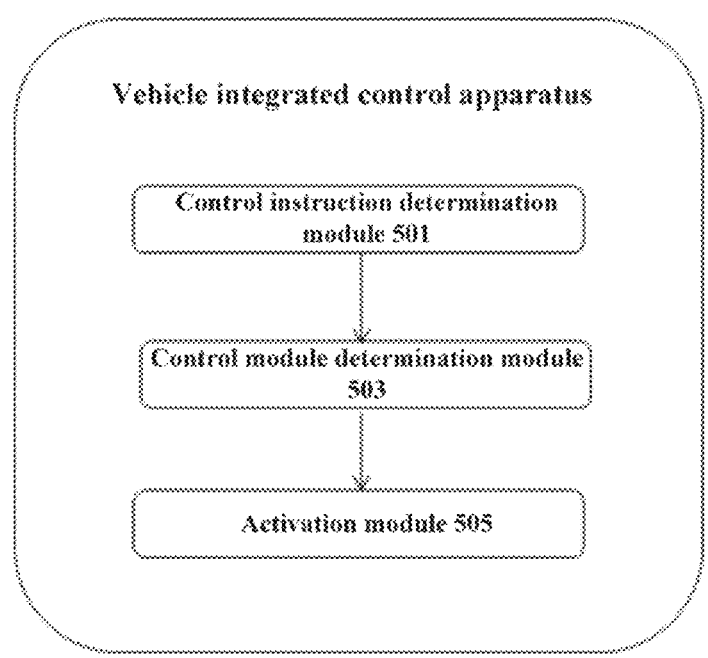
FIG. 9 is a structural block diagram of a vehicle integrated control apparatus provided by an embodiment of the present application.

Embodiments of the present application further provide a vehicle integrated control apparatus, as shown in FIG. 9, the apparatus is used for a vehicle integrated control system, the vehicle integrated control system at least may include an integration module and a plurality of control modules, the integration module is arranged in a vehicle, and the apparatus may include:
- a control instruction determination module 501, configured to determine, in response to a target operation performed by a user on the integration module, a target control instruction corresponding to the target operation;
- a control module determination module 503, configured to determine a target control module corresponding to the target control instruction, where the target control module is at least one of the plurality of control modules; and
- an activation module 505, configured to activate the target control module to cause the target control module to control the enabling and disabling of a corresponding function based on attribute information of internal and external environment of the vehicle.

the apparatus further includes:
a mapping relationship establishment module, configured to pre-establish a mapping relationship among an operation, a control instruction, and a control module;
accordingly, the control instruction determination module 501 may be configured to determine, in response to the target operation performed by a user on the integration module, the target control instruction corresponding to the target operation based on the mapping relationship; and
accordingly, the control module determination module 503 may be configured to determine the target control module corresponding to the target control instruction based on the mapping relationship.

In the embodiment of the present application, the apparatus further includes:
an internal and external environment attribute information acquisition module, configured to acquire the attribute information of internal and external environment, and transmit the acquired attribute information of internal and external environment to the target control module, where the attribute information of internal and external environment includes at least one of internal and external environment information, occupant information, or driving state information; and
a first state adjustment module, configured to adjust, when the attribute information of internal and external environment meets a preset condition, the target control module from an activated state to an enabled state.

In a feasible embodiment, the vehicle integrated control system further includes a prompt module respectively corresponding to each control module, the prompt module is integrally arranged on the integration module, and the apparatus may further include:
a prompt module determination module, configured to determine, in response to the target operation performed by the user on the integration module, a prompt module corresponding to the target operation; and
a first prompt module enabling module, configured to enable a prompt module corresponding to the target control instruction, where the prompt module includes at least one of an optical module, a sound module, a text module, an image module or a symbol module.

In a feasible embodiment, the vehicle integrated control system further includes one prompt module corresponding to the plurality of control modules, the prompt module is integrally arranged on the integration module, and the apparatus may further include:
a prompt mode determination module, configured to determine, in response to the target operation performed by the user on the integration module, a prompt mode corresponding to the target operation;
a second prompt module enabling module, configured to enable the prompt module and control the prompt module to prompt according to the prompt mode, such that the prompt module presents a state corresponding to the prompt mode,
where the prompt module includes an optical module, a sound module, a text module, an image module, or a symbol module.

In a feasible embodiment, the target control module includes an air conditioning automatic control module, the target operation includes a first target operation, the target control instruction includes a first target control instruction, the attribute information of internal and external environment includes the internal and external environment information, and the internal and external environment information includes an internal environment temperature, and the apparatus may further include:
a first target control instruction determination module, configured to determine, in response to the first target operation including pressing or touching performed by the user on the integration module, the first target control instruction corresponding to the first target operation;
an air conditioning automatic control determination module, configured to determine the air conditioning automatic control module corresponding to the first target control instruction;
an air conditioning automatic control activation module, configured to activate the air conditioning automatic control module;
a third prompt module enabling module, configured to enable a prompt module corresponding to the first target operation;
an internal environment temperature acquisition module, configured to acquire an internal environment temperature of the vehicle;
a second state adjustment module, configured to adjust, when the internal environment temperature does not meet a preset internal temperature threshold, the air conditioning automatic control module from an activated state to an enabled state; and an air conditioning automatic adjustment module, configured to adjust the internal environment temperature and/or air volume entering the vehicle through the air conditioning automatic control module, such that the internal environment temperature meets the preset internal temperature threshold.

Further, the apparatus further includes:

a first maintaining module, configured to maintain the activated state of the air conditioning automatic control module when the internal environment temperature meets the preset internal temperature threshold.

Accordingly, the target control module further includes a seat heating and ventilation module, the target operation further includes a second target operation, the target control instruction further includes a second target control instruction, the attribute information of internal and external environment includes the internal and external environment information and the occupant information, and the internal and external environment information includes an external environment temperature, and the apparatus may further include:

a second target control instruction determination module, configured to determine, in response to the user continuing to perform the second target operation including pressing or touching on the integration module, the second target control instruction corresponding to the second target operation;

a seat heating and ventilation determination module, configured to determine the seat heating and ventilation module corresponding to the second target control instruction;

a seat heating and ventilation activation module, configured to activate the seat heating and ventilation module;

a fourth prompt module enabling module, configured to enable a prompt module corresponding to the second target operation;

a pressure and temperature acquisition module, configured to acquire pressure information of a seat in the vehicle, a seat temperature of the seat, and an external environment temperature of the vehicle;

a third state adjustment module, configured to adjust, when the pressure information is greater than a preset pressure threshold, the seat temperature does not meet a preset seat temperature threshold, and the external environment temperature meets a preset external environment threshold, the seat heating and ventilation module from an activated state to an enabled state; and a seat heating and ventilation processing module, configured to heat and/or ventilate the seat based on the seat heating and ventilation module, such that the seat temperature meets the preset seat temperature threshold.

Accordingly, the apparatus further includes: a second maintaining module, configured to maintain the activated state of the seat heating and ventilation module when the pressure information is less than or equal to the preset pressure threshold, the seat temperature meets the preset seat temperature threshold, or the external environment temperature does not meet the preset external environment threshold.

Accordingly, the target control module further includes an air purification and sterilization module, the target operation includes a third target operation, the target control instruction further includes a third target control instruction, the attribute information of internal and external environment includes the internal and external environment information and the driving state information, and the internal and external environment information includes internal air parameter information, and the apparatus may further include:

a third target control instruction determination module, configured to determine, in response to the user continuing to perform the third target operation including pressing or touching on the integration module, the third target control instruction corresponding to the third target operation;

an air purification and sterilization determination module, configured to determine the air purification and sterilization module corresponding to the third target control instruction;

an air purification and sterilization activation module, configured to activate the air purification and sterilization module;

a fifth prompt module enabling module, configured to enable a prompt module corresponding to the third target operation;

a parameter and state information acquisition module, configured to acquire internal air parameter information of the vehicle and driving state information of the vehicle;

a fourth state adjustment module, configured to adjust, when the internal air parameter information is greater than a preset parameter threshold and the driving state information meets a preset driving condition, the air purification and sterilization module from an activated state to an enabled state; and a purification and sterilization processing module, configured to purify and sterilize the air in the vehicle based on the air purification and sterilization module, such that the air parameter information is less than or equal to the preset parameter threshold.

Accordingly, the apparatus further includes:

a third maintaining module, configured to maintain the activated state of the air purification and sterilization module when the internal air parameter information is less than or equal to the preset parameter threshold or the driving state information does not meet the preset driving condition.

Accordingly, the target operation further includes a fourth target operation, the target control instruction further includes a fourth target control instruction, and the apparatus may further include:

a fourth target control instruction determination module, configured to determine, in response to the user continuing to perform the fourth target operation including pressing or touching on the integration module, the fourth target control instruction corresponding to the fourth target operation;

a multi-module determination module, configured to determine the air conditioning automatic control module, the seat heating and ventilation module, and the air purification and sterilization module corresponding to the fourth target control instruction; and a disabling module, configured to disable the air conditioning automatic control module, the seat heating and ventilation module, and the air purification and sterilization module.

In the embodiment of the present application, the vehicle integrated control system further includes a terminal device of a user corresponding to the vehicle, and the control instruction determination module may include:

a sending unit, configured to receive a remote control instruction sent by the terminal device to the integration module;

a target operation determination unit, configured to determine a target operation corresponding to the remote control instruction; and a target control instruction determination unit, configured to determine a target control instruction corresponding to the target operation.

Accordingly, the vehicle integrated control system further includes a terminal device of a user corresponding to the vehicle, and the apparatus may further include:

a target control strategy determination module, configured to determine a target control strategy corresponding to the target control module;

a target control strategy sending module, configured to send the target control strategy to the terminal device;

a function control module, configured to control, when receiving an instruction for executing the target control strategy triggered by a user based on the terminal device, the enabling or disabling of a corresponding function through the target control strategy; and a prohibition module, configured to prohibit, when receiving an instruction for not executing the target control strategy triggered by the user based on the terminal device module, control on the enabling or disabling of a corresponding function through the target control strategy.

It should be noted that the system embodiments of the present application and the above method embodiments are based on the same inventive concept.

Embodiments of the present invention further provide an electronic device for vehicle integrated control, the electronic device including a processor and a memory, where the memory stores at least one instruction or at least one program, and the at least one instruction or the at least one program is loaded and executed by the processor to implement the vehicle integrated control method provided by the foregoing method embodiments.

Embodiments of the present invention further provide a computer-readable storage medium, the storage medium storing at least one instruction or at least one program, where the at least one instruction or the at least one program is loaded and executed by a processor to implement the vehicle integrated control method provided by the foregoing method embodiments.

Optionally, in the embodiments of the present specification, the storage medium may be located at at least one network server among a plurality of network servers of a computer network. Optionally, in this embodiment, the storage medium may include, but not limited to, any medium that may store program codes, such as a USB flash disk, a read-only memory (ROM), a random access memory (RAM), a mobile hard disk, a magnetic disk, or an optical disk.

The memory described in the embodiments of the present specification may be used for storing software programs and modules, and the processor executes various functional applications and data processing by running the software programs and modules stored in the memory. The memory may mainly include a program storage area and a data storage area, where the program storage area may store an operating system, application programs required by a function, etc.; and the data storage area may store data created on the basis of usage of the device, etc. In addition, the memory may include a high-speed random access memory, and may also include a non-volatile memory such as at least one disk memory device, a flash memory device or other volatile solid state memories. Accordingly, the memory may further include a memory controller to provide the processor with access to the memory.

It should be noted that the above sequence of embodiments of the present invention is only for description, and does not represent the advantages or disadvantages of the embodiments. In addition, specific embodiments of this specification have been described above. Other embodiments are within the scope of the appended claims. In some cases, the actions or steps recited in the claims may be performed in a different order from those in the embodiments and still achieve desired results. In addition, the processes depicted in the accompanying drawings do not necessarily require the particular order or sequential order shown to achieve the desired results. In some implementations, multitask processing and parallel processing are possible or may be advantageous.

Embodiments in the specification are described in a progressive way, same and similar parts among the embodiments can refer to each other, and each embodiment focuses on differences from the other embodiments. In particular, for apparatus and server embodiments, which are substantially similar to the method embodiments, the descriptions are relatively simple, and where relevant, reference can be made to partial descriptions of the method embodiments.

Those of ordinary skill in the art can understand that all or part of the steps for implementing the above embodiments may be completed by hardware or by a program instructing related hardware, and the program may be stored in a computer-readable storage medium, which may be a read-only memory, a magnetic disk, or an optical disc, etc.

The above descriptions are only preferred embodiments of this application, and are not intended to limit this application. Any modifications, equivalent replacements, improvements, etc. made within the spirit and principle of the present application shall be included in the protection scope of the present application.

What is claimed is:

1. A vehicle integrated control method, characterized in that the method is used for a vehicle integrated control system, the vehicle integrated control system at least comprises an integration module and a plurality of control modules, the integration module being arranged in a vehicle, and the method comprises:

determining, in response to a target operation performed by a user on the integration module, a target control instruction corresponding to the target operation;

determining a target control module corresponding to the target control instruction, wherein the target control module is at least one of the plurality of control modules; and activating the target control module to cause the target control module to control the enabling or disabling of a corresponding function based on attribute information of internal and external environment of the vehicle;

before determining, in response to a target operation performed by a user on the integration module, a target control instruction corresponding to the target operation, the method further comprises:

pre-establishing a mapping relationship among an operation, a control instruction, and a control module;

determining, in response to a target operation performed by a user on the integration module, a target control instruction corresponding to the target operation comprises:

in response to the target operation performed by the user on the integration module, determining the target control instruction corresponding to the target operation based on the mapping relationship; and determining a target control module corresponding to the target control instruction comprises:

determining the target control module corresponding to the target control instruction based on the mapping relationship;

after activating the target control module, the method further comprises:

acquiring the attribute information of internal and external environment, and transmitting the acquired attribute information of internal and external environment to the target control module, wherein the attribute information of internal and external environment comprises at least one of internal and external environment information, occupant information, or driving state information; and adjusting the target control module from an activated state to an enabled state when the attribute information of internal and external environment meets a preset condition.

2. The method according to claim 1, characterized in that the vehicle integrated control system further comprises a prompt module respectively corresponding to each control module, the prompt module is integrally arranged on the integration module, and the method further comprises:

determining, in response to the target operation performed by the user on the integration module, a prompt module corresponding to the target operation; and enabling the prompt module corresponding to the target control instruction, wherein the prompt module comprises at least one of an optical module, a sound module, a text module, an image module, or a symbol module.

3. The control method according to claim 2, characterized in that the optical module is an indicator light, and different control modules correspond to different indicator lights.

4. The method according to claim 1, characterized in that the vehicle integrated control system further comprises one prompt module corresponding to the plurality of control modules, the prompt module is integrally arranged on the integration module, and the method further comprises:

determining, in response to the target operation performed by the user on the integration module, a prompt mode corresponding to the target operation; and enabling the prompt module and controlling the prompt module to prompt according to the prompt mode, such that the prompt module presents a state corresponding to the prompt mode, wherein the prompt module comprises an optical module, a sound module, a text module, an image module, or a symbol module.

5. The control method according to claim 4, characterized in that the optical module is an indicator light, and different control modules correspond to different colors of the same indicator light.

6. The method according to claim 2, characterized in that the target control module comprises an air conditioning automatic control module, the target operation comprises a first target operation, the target control instruction comprises a first target control instruction, the attribute information of internal and external environment comprises the internal and external environment information, and the internal and external environment information comprises an internal environment temperature, and the method further comprises:

determining, in response to the first target operation comprising pressing or touching performed by the user on the integration module, the first target control instruction corresponding to the first target operation;

determining the air conditioning automatic control module corresponding to the first target control instruction;

activating the air conditioning automatic control module;

enabling the prompt module corresponding to the first target operation;

acquiring an internal environment temperature of the vehicle;

when the internal environment temperature does not meet a preset internal temperature threshold, adjusting the air conditioning automatic control module from an activated state to an enabled state; and adjusting the internal environment temperature and/or air volume entering the vehicle through the air conditioning automatic control module, such that the internal environment temperature meets the preset internal temperature threshold.

7. The method according to claim 6, characterized in that when the internal environment temperature meets the preset internal temperature threshold, the activated state of the air conditioning automatic control module is maintained.

8. The method according to claim 6, characterized in that the target control module further comprises a seat heating and ventilation module, the target operation further comprises a second target operation, the target control instruction further comprises a second target control instruction, the attribute information of internal and external environment comprises the internal and external environment information and the occupant information, and the internal and external environment information comprises an external environment temperature, and the method further comprises:

determining, in response to the user continuing to perform the second target operation comprising pressing or touching on the integration module, the second target control instruction corresponding to the second target operation;

determining the seat heating and ventilation module corresponding to the second target control instruction;

activating the seat heating and ventilation module;

enabling the prompt module corresponding to the second target operation;

acquiring pressure information of a seat in the vehicle, a seat temperature of the seat, and an external environment temperature of the vehicle, the occupant information being represented by the pressure information;

when the pressure information is greater than a preset pressure threshold, the seat temperature does not meet a preset seat temperature threshold, and the external environment temperature meets a preset external environment threshold, adjusting the seat heating and ventilation module from an activated state to an enabled state; and heating and/or ventilating the seat based on the seat heating and ventilation module, such that the seat temperature meets the preset seat temperature threshold.

9. The method according to claim 8, characterized in that when the pressure information is less than or equal to the preset pressure threshold, the seat temperature meets the preset seat temperature threshold, or the external environment temperature does not meet the preset external environment threshold, the activated state of the seat heating and ventilation module is maintained.

10. The method according to claim 8, characterized in that the target control module further comprises an air purification and sterilization module, the target operation comprises a third target operation, the target control instruction further comprises a third target control instruction, the attribute information of internal and external environment comprises the internal and external environment information and the driving state information, and the internal and external environment information comprises internal air parameter information, and the method further comprises:
- determining, in response to the user continuing to perform the third target operation comprising pressing or touching on the integration module, the third target control instruction corresponding to the third target operation;
- determining the air purification and sterilization module corresponding to the third target control instruction;
- activating the air purification and sterilization module;
- enabling the prompt module corresponding to the third target operation;
- acquiring internal air parameter information of the vehicle and driving state information of the vehicle;
- when the internal air parameter information is greater than a preset parameter threshold and the driving state information meets a preset driving condition, adjusting the air purification and sterilization module from an activated state to an enabled state; and
- purifying and sterilizing the air in the vehicle based on the air purification and sterilization module, such that the air parameter information is less than or equal to the preset parameter threshold.

11. The method according to claim 10, characterized in that when the internal air parameter information is less than or equal to the preset parameter threshold or the driving state information does not meet the preset driving condition, the activated state of the air purification and sterilization module is maintained.

12. The method according to claim 10, characterized in that the target operation further comprises a fourth target operation, the target control instruction further comprises a fourth target control instruction, and the method further comprises:
- determining, in response to the user continuing to perform the fourth target operation comprising pressing or touching on the integration module, the fourth target control instruction corresponding to the fourth target operation;
- determining the air conditioning automatic control module, the seat heating and ventilation module, and the air purification and sterilization module corresponding to the fourth target control instruction; and
- disabling the air conditioning automatic control module, the seat heating and ventilation module, and the air purification and sterilization module.

13. The method according to claim 1, characterized in that the vehicle integrated control system further comprises a terminal device of a user corresponding to the vehicle, and determining, in response to a target operation performed by a user on the integration module, a target control instruction corresponding to the target operation comprises:
- receiving a remote control instruction sent by the terminal device to the integration module;
- determining a target operation corresponding to the remote control instruction; and
- determining a target control instruction corresponding to the target operation.

14. The method according to claim 1, characterized in that the vehicle integrated control system further comprises a terminal device of a user corresponding to the vehicle, and after adjusting the target control module from an activated state to an enabled state when the attribute information of internal and external environment meets the preset condition, the method comprises:
- determining a target control strategy corresponding to the target control module; sending the target control strategy to the terminal device;
- when receiving an instruction for executing the target control strategy triggered by a user based on the terminal device, controlling the enabling or disabling of a corresponding function through the target control strategy; and
- when receiving an instruction for not executing the target control strategy triggered by the user based on the terminal device, prohibiting control on the enabling or disabling of a corresponding function through the target control strategy.

15. An electronic device, comprising a processor and a memory, wherein the memory stores at least one instruction or at least one program, and the at least one instruction or the at least one program is loaded and executed by the processor to implement the vehicle integrated control method according to claim 1.

16. A non-transitory computer-readable storage medium, storing at least one instruction or at least one program, wherein the at least one instruction or the at least one program is loaded and executed by a processor to implement the vehicle integrated control method according to claim 1.

* * * * *